United States Patent
Mukkavilli et al.

(10) Patent No.: US 8,477,809 B2
(45) Date of Patent: Jul. 2, 2013

(54) SYSTEMS AND METHODS FOR GENERALIZED SLOT-TO-INTERLACE MAPPING

(75) Inventors: Krishna Kiran Mukkavilli, San Diego, CA (US); Raghuraman Krishnamoorthi, San Diego, CA (US); Rajiv Vijayan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 358 days.

(21) Appl. No.: 11/834,671

(22) Filed: Aug. 6, 2007

(65) Prior Publication Data

US 2008/0107192 A1 May 8, 2008

Related U.S. Application Data

(63) Continuation of application No. 10/932,586, filed on Sep. 1, 2004, now Pat. No. 7,221,680.

(60) Provisional application No. 60/951,951, filed on Jul. 26, 2007, provisional application No. 60/951,950, filed on Jul. 26, 2007, provisional application No. 60/499,741, filed on Sep. 2, 2003, provisional application No. 60/559,740, filed on Apr. 5, 2004.

(51) Int. Cl.
*H04J 3/06* (2006.01)
*H04J 9/00* (2006.01)
*H04W 4/00* (2009.01)
*H04L 27/28* (2006.01)

(52) U.S. Cl.
USPC ............ 370/503; 370/329; 370/204; 375/260

(58) Field of Classification Search
USPC ........... 370/203–207, 328–329, 503; 375/260
See application file for complete search history.

(56) References Cited

U.S. PATENT DOCUMENTS

| | | | |
|---|---|---|---|
| 5,404,355 | A | 4/1995 | Raith |
| 5,943,344 | A | 8/1999 | Keller et al. |
| 5,995,147 | A | 11/1999 | Suzuki |
| 6,088,326 | A | 7/2000 | Lysejko et al. |
| 6,424,678 | B1 | 7/2002 | Doberstein et al. |
| 6,515,960 | B1 | 2/2003 | Usui et al. |

(Continued)

FOREIGN PATENT DOCUMENTS

| | | |
|---|---|---|
| CL | 2710-2004 | 8/2005 |
| CL | 2714-2004 | 8/2005 |

(Continued)

OTHER PUBLICATIONS

International Search Report—PCT/US04/028676, International Search Authority—United States—May 4, 2006.

(Continued)

*Primary Examiner* — Ronald Abelson
(74) *Attorney, Agent, or Firm* — Arent Fox LLP

(57) ABSTRACT

A transmitter or receiver device includes a processing system configured to have one or more pilot interlace vectors and one or more distance vectors. The processing system is further configured to generate a first slot interlace for a first slot based on the one or more pilot interlace vectors, and is further configured to generate a second slot interlace for a second slot based on the first slot interlace and the one or more distance vectors. Additional slot interlaces for all other slots may also be generated based on the first slot interlace and the one or more distance vectors.

106 Claims, 9 Drawing Sheets

U.S. PATENT DOCUMENTS

| | | |
|---|---|---|
| 6,545,997 B1 | 4/2003 | Böhnke et al. |
| 6,563,881 B1 | 5/2003 | Sakoda et al. |
| 6,594,252 B1 | 7/2003 | Barany et al. |
| 6,618,353 B2 | 9/2003 | Merrill et al. |
| 6,721,267 B2 | 4/2004 | Hiben et al. |
| 6,801,580 B2 | 10/2004 | Kadous |
| 6,810,006 B2 | 10/2004 | Michon et al. |
| 6,853,629 B2 | 2/2005 | Alamouti et al. |
| 6,873,607 B1 | 3/2005 | Hamada et al. |
| 6,947,408 B1 | 9/2005 | Liberti et al. |
| 7,058,005 B2 | 6/2006 | Ehrmnn-Patin et al. |
| 7,110,349 B2 | 9/2006 | Branlund et al. |
| 7,171,160 B2 | 1/2007 | Chuah et al. |
| 7,197,022 B2 | 3/2007 | Stanwood et al. |
| 7,221,680 B2 | 5/2007 | Vijayan et al. |
| 7,317,680 B2 | 1/2008 | Ma et al. |
| 7,366,462 B2 | 4/2008 | Murali et al. |
| 7,782,810 B2 | 8/2010 | Han et al. |
| 2001/0012322 A1 | 8/2001 | Nagaoka et al. |
| 2002/0088005 A1 | 7/2002 | Wu et al. |
| 2002/0105970 A1 | 8/2002 | Shvodian |
| 2002/0136170 A1 | 9/2002 | Struhsaker |
| 2002/0142780 A1 | 10/2002 | Airy et al. |
| 2002/0154705 A1 | 10/2002 | Walton et al. |
| 2003/0043928 A1 | 3/2003 | Ling et al. |
| 2004/0136393 A1 | 7/2004 | Riveiro Insua et al. |
| 2005/0088959 A1 | 4/2005 | Kadous |
| 2005/0122928 A1 | 6/2005 | Vijayan et al. |
| 2005/0135308 A1 | 6/2005 | Vijayan et al. |
| 2005/0141475 A1 | 6/2005 | Vijayan et al. |
| 2005/0174931 A1 | 8/2005 | Krishnamoorthi |
| 2005/0249181 A1 | 11/2005 | Vijayan et al. |
| 2006/0078001 A1 | 4/2006 | Chandra et al. |
| 2006/0222108 A1 | 10/2006 | Cousineau |
| 2008/0186935 A1 | 8/2008 | Ling et al. |
| 2008/0291860 A1 | 11/2008 | Vijayan et al. |
| 2009/0175210 A1 | 7/2009 | Vijayan et al. |

FOREIGN PATENT DOCUMENTS

| | | |
|---|---|---|
| CL | 2716-2004 | 8/2005 |
| CL | 2717-2004 | 8/2005 |
| CN | 1894876 | 1/2007 |
| CN | 1998212 A | 7/2007 |
| EP | 0829989 | 3/1998 |
| EP | 1041845 A1 | 10/2000 |
| EP | 1292061 | 3/2003 |
| EP | 1388954 | 2/2004 |
| JP | 09219692 | 8/1997 |
| JP | 10066039 | 3/1998 |
| JP | 10503894 | 4/1998 |
| JP | 10173624 A | 6/1998 |
| JP | 10191431 A | 7/1998 |
| JP | 2001223665 | 8/2001 |
| JP | 2001308818 A | 11/2001 |
| JP | 2002111631 | 4/2002 |
| JP | 2002198929 | 7/2002 |
| JP | 2004531944 A | 10/2004 |
| JP | 2007525102 A | 8/2007 |
| KR | 20070048202 A | 5/2007 |
| RU | 2160508 | 12/2000 |
| TW | 510103 B | 11/2002 |
| TW | 531994 B | 5/2003 |
| TW | 550894 B | 9/2003 |
| WO | WO9210890 | 6/1992 |
| WO | WO9852380 | 11/1998 |
| WO | WO9955030 A1 | 10/1999 |
| WO | WO0117611 | 10/2001 |
| WO | WO0182544 | 11/2001 |
| WO | WO0189099 | 11/2001 |
| WO | 0209455 | 1/2002 |
| WO | WO0209455 | 1/2002 |
| WO | WO0231991 A2 | 4/2002 |
| WO | 0249306 | 6/2002 |
| WO | 02087104 | 10/2002 |
| WO | WO2005022811 | 3/2005 |
| WO | WO 2005/041515 A1 | 5/2005 |
| WO | WO 2005/043310 A2 | 5/2005 |
| WO | WO 2005/043829 A2 | 5/2005 |
| WO | WO 2005/043855 A1 | 5/2005 |
| WO | WO2005041515 | 5/2005 |
| WO | WO2005043794 | 5/2005 |
| WO | 2005112378 | 11/2005 |
| WO | WO2005112566 | 12/2005 |
| WO | WO2005114940 A1 | 12/2005 |
| WO | WO2005122627 | 12/2005 |
| WO | WO2006015268 A2 | 2/2006 |
| WO | WO2006069316 | 6/2006 |
| WO | 2006086878 | 8/2006 |
| WO | 2006099222 | 9/2006 |
| WO | WO2006099323 A1 | 9/2006 |
| WO | WO 2006/138206 A1 | 12/2006 |
| WO | WO2007014360 | 2/2007 |
| WO | WO2007050921 | 5/2007 |

OTHER PUBLICATIONS

K.Takamura et al, "Field Trial Results of a Band Hopping OFDM System",1999, pp. 310-314.

Supplementary Search Report—EP04783049, Search Authority—Munich Patent Office—Jan. 11, 2007.

Written Opinion, PCT/US2004/028676, International Searching Authority, United States, May 4, 2006.

International Preliminary Report on Patentability, PCT/US2004/028676, International Preliminary Examining Authority, United States, Dec. 12, 2006.

Partial European Search Report, EP08006309, European Patent Office, The Hague, Feb. 25, 2009.

Sparmann U et al: "On the Effectiveness of Residue Code Checking for Parallel Two's Complement Multipliers" IEEE Transactions on Very Large Scale Integration (VLSI) Systems, vol. 4, No. 2, Jun. 1, 1996, IEEE Service Center Piscataway, NJ, US, ISSN: 1063-8210.

International Preliminary Report on Patentability, PCT/US2008/072372, International Bureau, The International Bureau of WIPO, Feb. 4, 2010.

International Search Report and Written Opinion - PCT/US08/072372; International Search Authority—European Patent Office—May 25, 2009.

Fujita, et al., "Basic Transmission Performance of BDMA system", Technical Report of IEICE, Japan, the Institute of Electronics, Information and Communication Engineers, Apr. 22, 1999, vol. 99, No. 19, pp. 7-12.

International Search Report and Written Opinion—PCT/US08/072372; International Search Autority—European Patent Office—May 25, 2009.

Translation of Office Action in Japanese Patent Application No. 2006-525457, Jan. 11, 2011, Japan.

Taiwan Search Report—TW097142226—TIPO—Aug. 20, 2012.

Taiwan Search Report—TW097129964—TIPO—Oct. 15, 2012.

FIG. 6

SYSTEMS AND METHODS FOR GENERALIZED SLOT-TO-INTERLACE MAPPING

CROSS-REFERENCE TO RELATED APPLICATIONS

The present application for patent is a continuation-in-part of patent application Ser. No. 11/751,631, entitled "Multiplexing and Transmission of Multiple Data Streams in a Wireless Multi-Carrier Communication System," filed May 21, 2007, which is a continuation of patent application Ser. No. 10/932,586 entitled "Multiplexing and Transmission of Multiple Data Streams in a Wireless Multi-Carrier Communication System" filed Sep. 1, 2004, issued as U.S. Pat. No. 7,221,680, which claims priority to Provisional Application No. 60/499,741, entitled "Method for Multiplexing and Transmitting Multiple Multimedia Streams to Mobile Terminals over Terrestrial Radio Links," filed Sep. 2, 2003, and Provisional Application No. 60/559,740, entitled "Multiplexing and Transmission of Multiple Data Streams in a Wireless Multi-Carrier Communication System," filed Apr. 5, 2004, and claims the benefit of priority to Provisional Application No. 60/951,951, entitled "Systems and Methods for Generalized Slot-to-Interface Mapping," filed Jul. 26, 2007, and Provisional Application 60,951,950, entitled "Multiplexing and Transmission of Multiple Data Streams in a Wireless Multi-Carrier Communication System," filed Jul. 26, 2007, all of which are assigned to the assignee hereof and hereby expressly incorporated by reference herein.

BACKGROUND

I. Field

The subject technology relates generally to telecommunications, and more specifically to systems and methods for generalized slot-to-interlace mapping.

II. Background

Forward Link Only (FLO) is a digital wireless technology that has been developed by an industry-led group of wireless providers. The FLO technology was designed in one case for a mobile multimedia environment and exhibits performance characteristics suited for use on cellular handsets. It uses advances in coding and interleaving to achieve high-quality reception, both for real-time content streaming and other data services. FLO technology can provide robust mobile performance and high capacity without compromising power consumption. The technology also reduces the network cost of delivering multimedia content by dramatically decreasing the number of transmitter devices needed to be deployed. In addition, FLO technology-based multimedia multicasting complements wireless operators' cellular network data and voice services, delivering content to the same cellular handsets used on 3G networks.

The FLO wireless system has been designed to broadcast real time audio and video signals, apart from non-real time services to mobile users. The respective FLO transmission is carried out using tall and high power transmitter devices to ensure wide coverage in a given geographical area. Furthermore, it is common to deploy 3-4 transmitter devices in most markets to ensure that the FLO signal reaches a significant portion of the population in a given market. During the acquisition process of a FLO data packet, several determinations and computations are made to determine such aspects as frequency offsets for the respective wireless receiver device. Given the nature of FLO broadcasts that support multimedia data acquisitions, efficient processing of such data and associated overhead information is paramount. For instance, when determining frequency offsets or other parameters, complex processing and determinations are required where determinations of phase and associated angles are employed to facilitate the FLO transmission and reception of data.

Wireless communication systems such as FLO are designed to work in a mobile environment where the channel characteristics in terms of the number of channel taps with significant energy, path gains and the path delays are expected to vary quite significantly over a period of time. In an Orthogonal Frequency Division Multiplexing (OFDM) system, the timing synchronization block in a receiver device responds to changes in the channel profile by selecting the OFDM symbol boundary appropriately to maximize the energy captured in the Fast Fourier Transform (FFT) window. When such timing corrections take place, it is important that the channel estimation algorithm takes the timing corrections into account while computing the channel estimate to be used for demodulating a given OFDM symbol. In some implementations, the channel estimate is also used to determine timing adjustment to the symbol boundary that needs to be applied to future symbols, thus resulting in a subtle interplay between timing corrections that have already been introduced and the timing corrections that will be determined for the future symbols. Furthermore, it is common for channel estimation block to process pilot observations from multiple OFDM symbols in order to result in a channel estimate that has better noise averaging and also resolves longer channel delay spreads. When pilot observations from multiple OFDM symbols are processed together to generate channel estimate, it is important that the underlying OFDM symbols are aligned with respect to the symbol timing.

SUMMARY

The following presents a simplified summary of various configurations of the subject technology in order to provide a basic understanding of some aspects of the configurations. This summary is not an extensive overview. It is not intended to identify key/critical elements or to delineate the scope of the configurations disclosed herein. Its sole purpose is to present some concepts in a simplified form as a prelude to the more detailed description that is presented later.

In one aspect of the disclosure, a transmitter or receiver device includes a processing system configured to have one or more pilot interlace vectors and one or more distance vectors. The processing system is further configured to provide a first slot interlace based on the one or more pilot interlace vectors, and is further configured to provide a second slot interlace based on the first slot interlace and the one or more distance vectors.

In another aspect of the disclosure, a transmitter or receiver device includes means for including one or more pilot interlace vectors, means for including one or more distance vectors, means for providing a first slot interlace based on the one or more pilot interlace vectors, and means for providing a second slot interlace based on the first slot interlace and the one or more distance vectors.

In a further aspect of the disclosure, a method is described for providing slot interlaces or providing communication at a transmitter or receiver device. The method includes receiving one or more pilot interlace vectors, receiving one or more distance vectors, providing a first slot interlace based on the one or more pilot interlace vectors, and providing a second slot interlace based on the first slot interlace and the one or more distance vectors.

In yet a further aspect of the disclosure, a readable medium includes instructions executable by a transmitter or receiver device. The instructions include code for receiving one or more pilot interlace vectors, receiving one or more distance vectors, providing a first slot interlace based on the one or more pilot interlace vectors, and providing a second slot interlace based on the first slot interlace and the one or more distance vectors.

In yet a further aspect of the disclosure, a transmitter or receiver device includes a pilot interlace vector unit configured to include one or more pilot interlace vectors and a distance vector unit configured to include one or more distance vectors. The transmitter or receiver device further includes a slot interlace computation unit configured to provide a first slot interlace based on the one or more pilot interlace vectors and further configured to provide a second slot interlace based on the first slot interlace and the one or more distance vectors.

In yet a further aspect of the disclosure, additional slot interlaces for all other slots may be generated based on the first slot interlace and the one or more distance vectors.

It is understood that other configurations will become readily apparent to those skilled in the art from the following detailed description, wherein it is shown and described only various configurations by way of illustration. As will be realized, the teachings herein may be extended to other and different configurations and its several details are capable of modification in various other respects, all without departing from the scope of the present disclosure. Accordingly, the drawings and detailed description are to be regarded as illustrative in nature and not as restrictive.

BRIEF DESCRIPTION OF THE DRAWINGS

FIG. 6 is an exemplary table for slot-to-interlace mapping.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Figure 1:
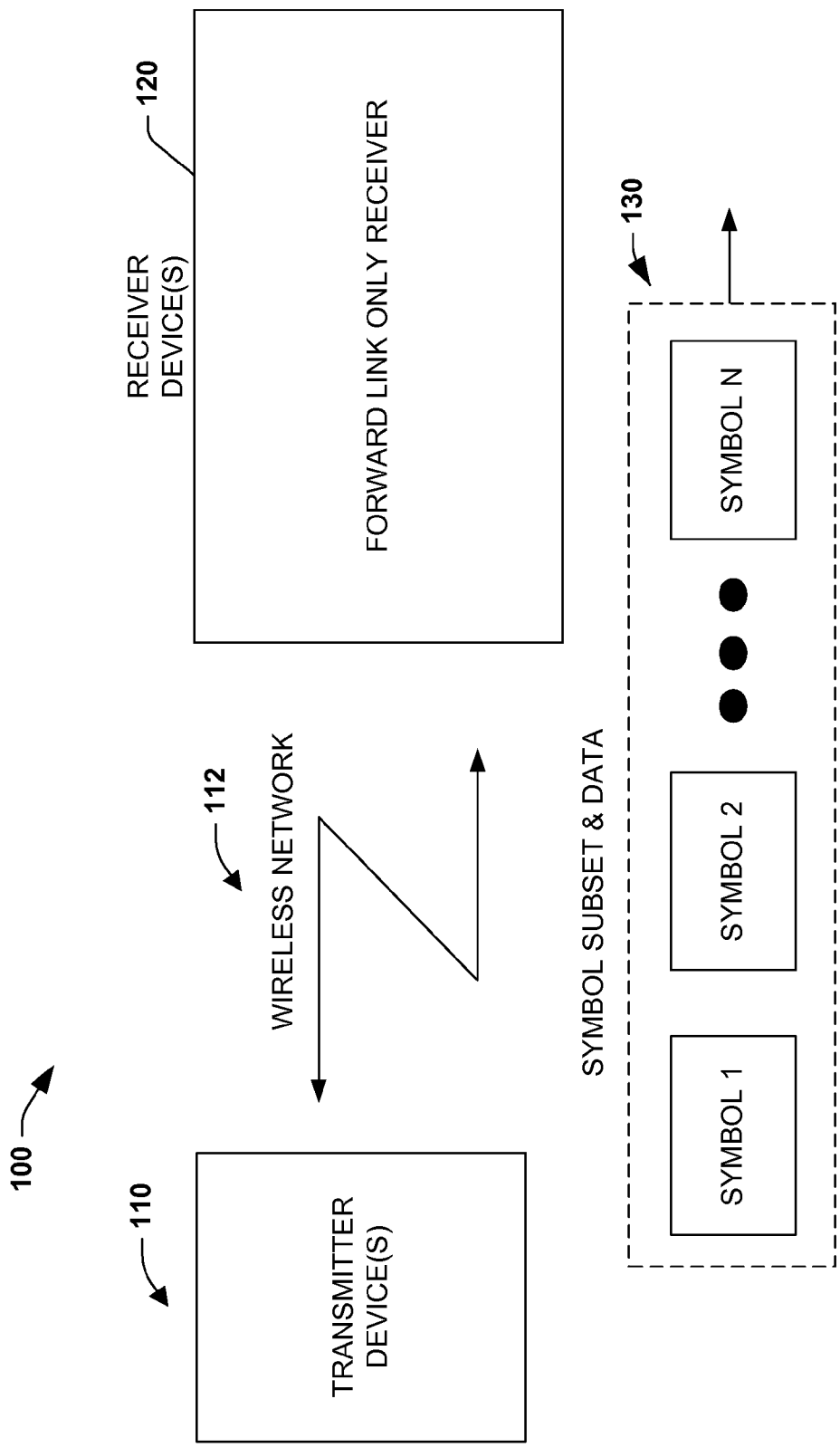
FIG. 1 is a conceptual block diagram illustrating an example of a wireless network system for forward link only networks (FLOs).

FIG. 1 is a conceptual block diagram illustrating an example of a wireless network system 100 for forward link only networks. The system 100 includes one or more transmitter devices 110 that can communicate across a wireless network 112 to one or more receiver devices 120.

A receiver device 120 can be any suitable communications device such as a cell phone, a wireless phone, a wired phone, a laptop computer, a desktop computer, a personal digital assistant (PDA), a data transceiver, a modem, a pager, a camera, a game console, an MPEG Audio Layer-3 (MP3) player, a media gateway system, an audio communications device, a video communications device, a multimedia communications device, a component of any of the foregoing devices (e.g., a printed circuit board(s), an integrated circuit(s), or a circuit component(s)), or any other suitable audio, video, or multimedia device, or a combination thereof. A transmitter device 110 may be any suitable communications device that can transmit, such as a base station or a broadcasting station. Furthermore, any of the devices described above in this paragraph can be a receiver device, if it can receive a signal, or a transmitter device, if it can transmit a signal. Thus, any of the receiver devices described above can be a transmitter device, if it can transmit a signal, and any of the transmitter devices described above can be a receiver device, if it can receive a signal. In addition, a device can be referred to as a user device when it is used, or to be used, by a user.

Portions of the receiver devices 120 may be employed to decode a symbol subset 130 and other data such as multimedia data. The symbol subset 130 may be transmitted in an Orthogonal Frequency Division Multiplexing (OFDM) network that employs forward link only (FLO) protocols for multimedia data transfer. Channel estimation can be based on uniformly spaced pilot tones inserted in the frequency domain, and in respective OFDM symbols.

Figure 2:
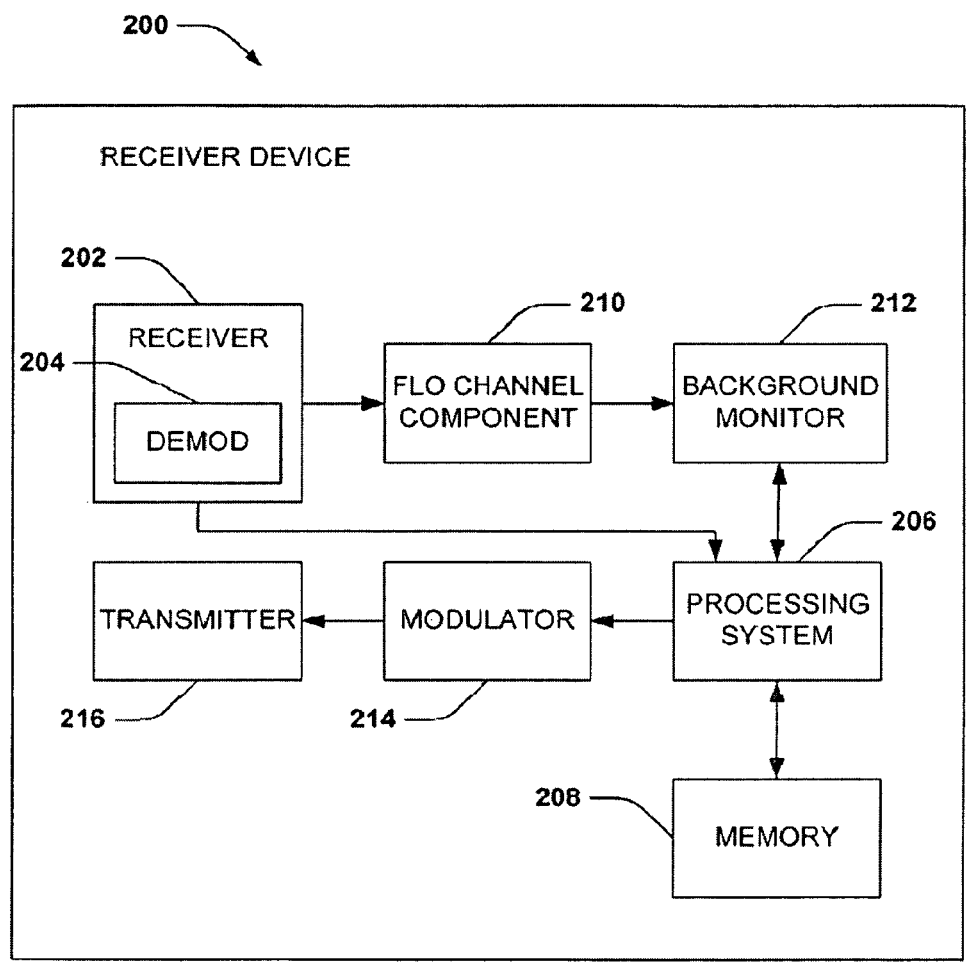
FIG. 2 is a conceptual block diagram illustrating an example of a receiver device that may be employed in a wireless communication environment.

FIG. 2 is a conceptual block diagram illustrating an example of a receiver device 200 that may be employed in a wireless communication environment, in accordance with one or more aspects set forth herein. A receiver device 200 may include a receiver 202 that receives a signal from, for instance, a receive antenna (not shown), and performs typical actions (e.g., filters, amplifies, down converts, etc.) on the received signal and digitizes the conditioned signal to obtain samples. A demodulator 204 can demodulate and provide received pilot symbols to a processing system 206 for channel estimation. A FLO channel component 210 may be provided to process FLO signals. This can include, for instance, digital stream processing and/or positioning location calculations among other processes. A processing system 206 may be, for example, a processor dedicated to analyzing information received by the receiver 202 and/or generating information for transmission by a transmitter 216, a processor that controls one or more components of the receiver device 200, or a processor that analyzes information received by the receiver 202, generates information for transmission by the transmitter 216, and controls one or more components of the receiver device 200.

The processing system 206 may be implemented using software, hardware, or a combination of both. Software shall be construed broadly to mean instructions, data, or any combination thereof, whether referred to as software, firmware, middleware, microcode, hardware description language, or otherwise. By way of example, the processing system 206 may be implemented with one or more processors. A processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The receiver device 200 can additionally include a memory 208 that is operatively coupled to the processing system 206 and that can store information related to data processing.

Readable media may include storage integrated into a processor, such as might be the case with an ASIC, and/or storage external to a processor such as the memory 208. By way of illustration, and not limitation, readable media may include one or more of volatile memory, nonvolatile memory, a Random Access Memory (RAM), a flash memory, a Read Only Memory (ROM), a Programmable Read-Only Memory (PROM), an Erasable PROM (EPROM), a register, a hard disk, a removable disk, a CD-ROM, a DVD, or any other suitable storage device. In addition, readable media may include a transmission line or a carrier wave that encodes a data signal. A readable medium may be a computer-readable medium encoded or stored with a computer program or instructions. The computer program or instructions may be executable by a transmitter or receiver device or by a processing system of a transmitter or receiver device.

The receiver device 200 may further include a background monitor 214 for processing FLO data, a symbol modulator 214, and the transmitter 216 that transmits the modulated signal.

Figure 3:
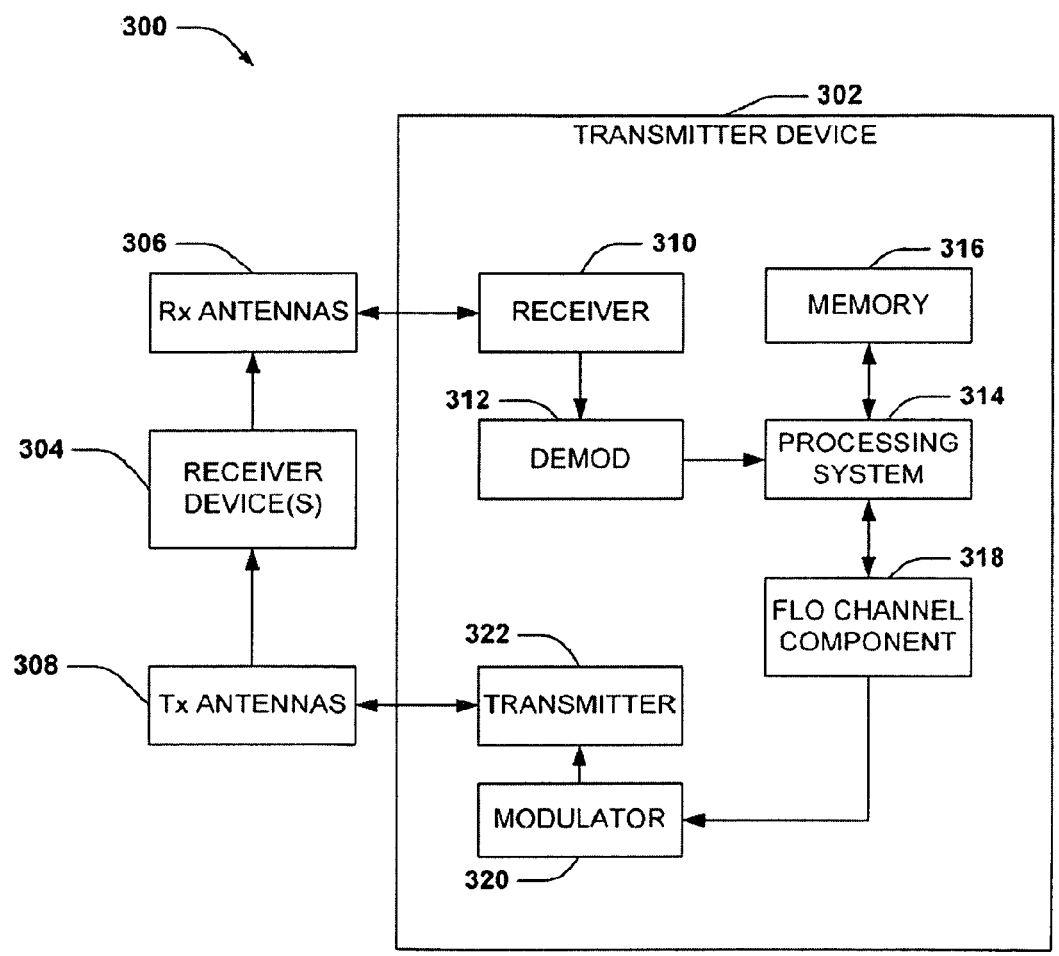
FIG. 3 is a conceptual block diagram illustrating an example of a system that includes a transmitter device and one or more receiver devices.

FIG. 3 is a conceptual block diagram illustrating an example of a system 300 that includes a transmitter device 302 and one or more receiver devices 304. The transmitter device 302 may include a receiver 310 that receives signal(s) from the one or more receiver devices 304 through one or more receive antennas 306, and a transmitter 322 that transmits to the one or more receiver devices 304 through one or more transmit antennas 308. The receiver 310 can be operatively associated with a demodulator 312 that demodulates received information. Demodulated symbols can be analyzed by a processing system 314 that is similar to the processing system 206 described above, which may be coupled to a memory 316 that stores information related to data processing.

The processing system 314 may be further coupled to a FLO channel component 318 that facilitates processing of FLO information associated with one or more respective receiver devices 304. The FLO channel component 318 can append information to a signal related to an updated data stream for a given transmission stream for communication with the receiver devices 304, to provide an indication that a new optimum channel has been identified and acknowledged. A modulator 320 may also be provided to multiplex a signal for transmission by the transmitter 322. The descriptions provided above for a processing system and readable media with reference to FIG. 2 apply similarly to the components in FIG. 3.

Figure 4:
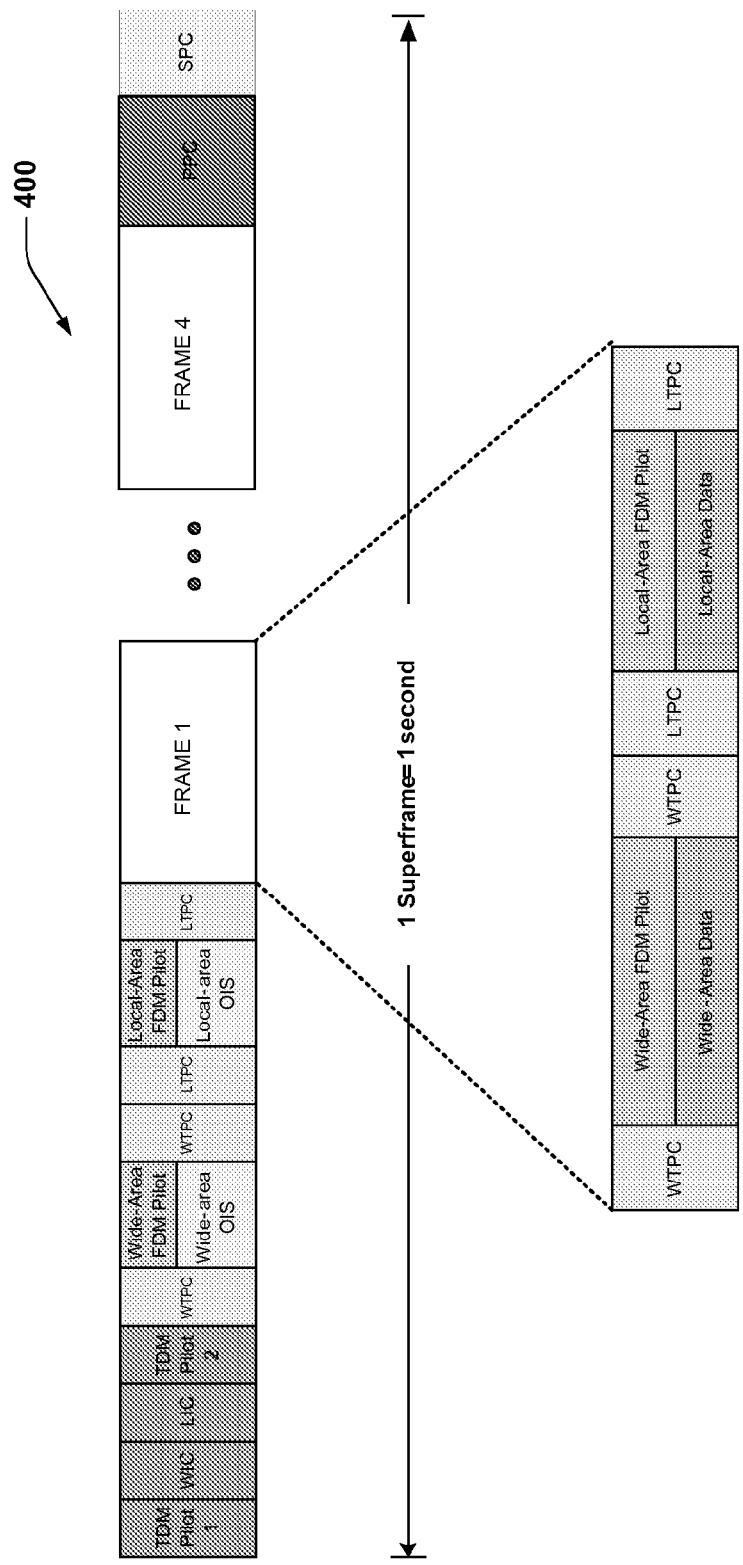
FIG. 4 illustrates an exemplary FLO physical layer superframe.

FIG. 4 illustrates an exemplary FLO physical layer superframe 400. A superframe 400 may include, among others, Time Division Multiplexed (TDM) pilots (e.g., TDM Pilot 1 and TDM Pilot 2), Wide-Area Identification Channel (WIC), Local-Area Identification Channel (LIC), Overhead Information Symbols (OIS), four frames of data (e.g., Frame 1 through Frame 4), Positioning Pilot Channel (PPC), and Signaling Parameter Channel (SPC). The TDM pilots may allow rapid acquisition of the OIS. The OIS may describe the location of the data for each media service in the superframe. A superframe structure is not limited to what is illustrated in FIG. 4, and a superframe may consist of less elements or more elements than what is illustrated in FIG. 4.

OFDM is a form of multi-carrier modulation. The available bandwidth may be divided into N bins, referred to as subcarriers, with each subcarrier modulated, for example, by a quadrature amplitude modulated (QAM) symbol. In FLO, transmission and reception may be based on using 4096 (4K) subcarriers, and the QAM modulation symbols may be chosen, for example, from a QPSK or 16-QAM alphabet.

Each superframe may include multiple OFDM symbols. By way of illustration, a superframe may include 200 OFDM symbols per MHz of available bandwidth (e.g., 1200 OFDM symbols for 6 MHz). In each symbol, there may be multiple subcarriers (e.g., 4000 subcarriers). These subcarriers may be disjointly grouped into interlaces.

Figure 5:
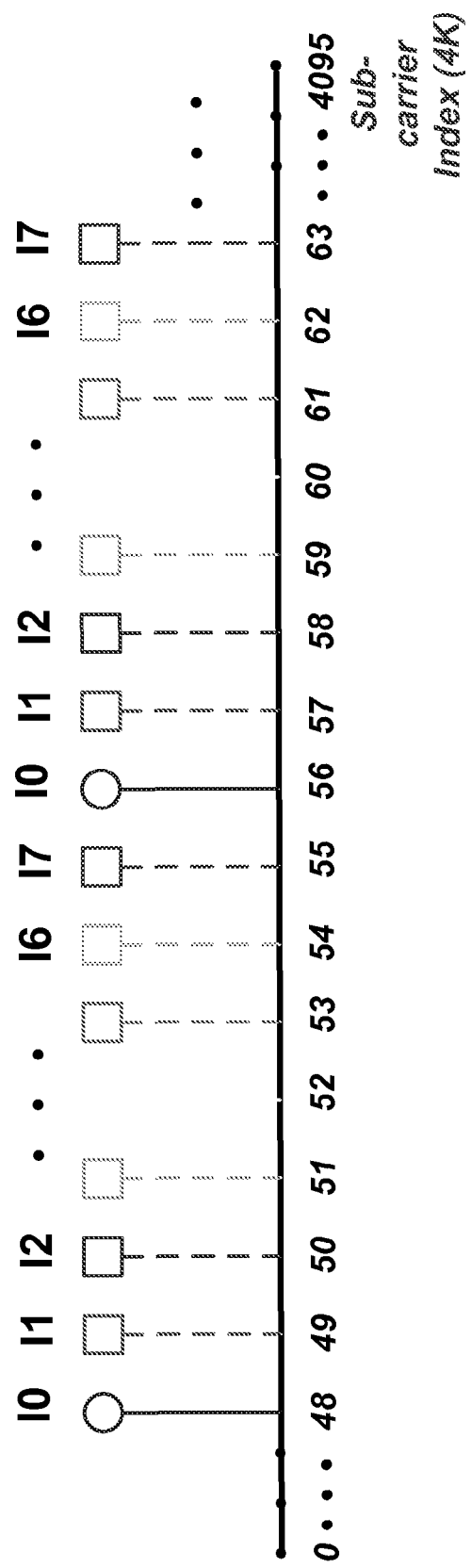
FIG. 5 illustrates an exemplary interlace structure.

As illustrated in FIG. 5, an exemplary interlace structure may include, for example, 8 interlaces. In this example, the interlace indices range from 0 to 7 (i.e., I0, I1, I2, I3, I4, I5, I6, I7 and I8). Each interlace may consist of, for example, 500 subcarriers that are evenly spaced across the signal bandwidth. Between the adjacent subcarriers within each interlace, there are 7 subcarriers, each of which belongs to a different interlace. In each OFDM symbol, one interlace may be assigned to the pilot interlace and may be used for channel estimation. Hence, 500 subcarriers may be modulated with known (pilot) modulation symbols. The remaining 7 interlaces, or 3500 subcarriers, may be available for modulation with data symbols. While FIG. 5 illustrates an exemplary interlace structure/function, an interlace structure/function is not limited to this configuration, and it can be of other type of configurations (e.g., having any number of interlaces).

Each interlace may be uniformly distributed in frequency, so that it may achieve the full frequency diversity within the available bandwidth. These interlaces may be assigned to logical channels that vary in terms of duration and number of actual interlaces used. This provides flexibility in the time diversity achieved by any given data source. Lower data rate channels can be assigned fewer interlaces to improve time diversity, while higher data rate channels may utilize more interlaces to minimize the radio's on-time and reduce power consumption.

Figure 6:
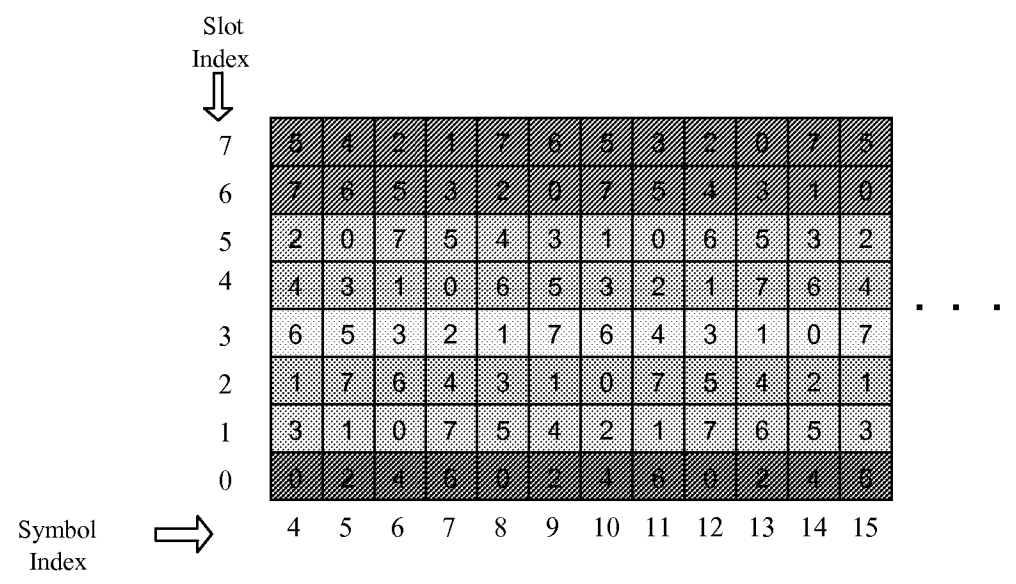

FIG. 6 is an exemplary table for slot-to-interlace mapping. The vertical axis indicates slot indices. The horizontal axis indicates symbol indices. The values in the table indicate interlace indices. According to one aspect of the disclosure, a slot may refer to a group of symbols, an interlace may refer to a group of subcarriers, and each slot may be mapped to an interlace in each symbol period based on a slot-to-interlace mapping scheme. A slot, which may be referred to as a transmission slot, may correspond to an interlace or a group of modulation symbols in one symbol period. In another aspect of the disclosure, a slot may be mapped to one or more interlaces, and an interlace may be mapped to one or more slots. A time unit for a frame may include a MAC time unit at the MAC (or allocation) layer and an OFDM symbol period at the physical (PHY) layer. A symbol period can refer to a MAC time unit in the context of physical layer channel (PLC) allocation or an OFDM symbol period in the context of subcarrier allocation. A symbol period may refer to a time unit of a symbol index.

While the number of subcarriers (i.e., FFT size) can be 4K, as described previously, the subject technology is not limited to this number of subcarriers or FFT size. The subject technology is capable of multiplexing and transmitting multiple data streams in OFDM systems of various FFT sizes. For an OFDM system with a 4K FFT size, a group of 500 modulation symbols, forming a slot, may be mapped into one interlace.

In one aspect of the disclosure, a slot may be fixed across different FFT sizes. Moreover, the size of an interlace may be $\frac{1}{8}^{th}$ the number of active subcarriers, and a slot may be mapped into either a fractional or a multiple (including one) interlaces based on the FFT size. The interlace(s) assigned to a slot may reside in multiple OFDM symbol periods. For example, for a 2K FFT size, a slot (i.e., 500 modulation symbols) maps into 2 interlaces over 2 consecutive 2K OFDM symbols. Similarly, for a 1K FFT size, a slot maps into 4 interlaces over 4 consecutive 1K OFDM symbols. Further, as an example, the number of useable subcarriers for 1K, 2K, 4K and 8K FFT sizes, respectively, may be 1000, 2000, 4000 and 8000, since the useable subcarriers may not include, for example, guard subcarriers. That is, an FFT size of 1K contains 1024 subcarriers, where 24 of the subcarriers may be used as guard subcarriers, for example. The number of guard subcarriers may, for example, increase proportionally with FFT size.

It follows that for an 8K FFT size, a slot maps into half of an interlace over half of an 8K OFDM symbol. It is noted that, regardless of the FFT size, a MAC time unit may comprise, for example, 8 slots. Table 1 below shows exemplary relationships between FFT sizes of 1K, 2K, 4K and 8K and their respective number of OFDM symbols per MAC time unit, number of subcarriers per interlace, and number of interlaces per slot:

TABLE 1

| FFT Size | Number of OFDM Symbols per MAC Time Unit | Number of Subcarriers per Interlace | Number of Interlaces per Slot |
| --- | --- | --- | --- |
| 1024 (1K) | 4 | 125 | 4 |
| 2048 (2K) | 2 | 250 | 2 |
| 4096 (4K) | 1 | 500 | 1 |
| 8192 (8K) | ½ | 1000 | ½ |

Exemplary relationships between OFDM symbol indices and MAC time indices are shown in Table 2 below.

TABLE 2

| FFT Size | OFDM Symbol Indices for MAC Time Index m (m = 4, 5, ...) |
| --- | --- |
| 1024 (1K) | 4m − 12, 4m − 11, 4m − 10, 4m − 9 |
| 2048 (2K) | 2m − 4, 2m − 3 |
| 4096 (4K) | m |
| 8192 (8K) | (m + 3)/2 |

According to one aspect of the disclosure, relying on the relationships between MAC time units and OFDM symbols and the relationships between slots and interlaces, the subject technology is capable of MAC layer multiplexing over MAC time units and slots, regardless of the FFT size of the OFDM system. The physical layer can map MAC time units and slots to OFDM symbols and interlaces, respectively, for various FFT sizes.

Although the examples above refer only to 1K, 2K, 4K and 8K FFT sizes, the subject technology is not limited to these particular FFT sizes and other FFT sizes can be implemented without departing from the scope of the subject technology.

A system may include multiple slots per symbol (e.g., 8 slots per symbol as shown in FIG. 6). While one slot (e.g., slot 0) may be assigned to pilot symbols, the other slots (e.g., slots 1 through 7) may be made available for allocation to data symbols. Pilot symbols are known a priori by the transmitter and receiver devices. Pilot symbols may be used by a transmitter or receiver device for, by way of illustration, frame synchronization, frequency acquisition, timing acquisition, and/or channel estimation. In this example, slot 0 may be referred to as a pilot slot, and slots 1 through 7 may be referred to as data slots. Alternatively, multiple slots (e.g., slot 1 and 3) may be assigned to pilot symbols, and the remaining slots may be allocated to data symbols. In this alternative example slots 1 and 3 may be referred to as pilot slots, and the remaining slots may be referred to as data slots. While FIG. 6 illustrates an exemplary slot structure/function, a slot structure/function is not limited to this configuration. A slot structure/function can be of other type of configurations (e.g., a slot structure may have any number of slots, and the slots may be allocated in many different ways and for various types of information).

In FIG. 6, each of the slots is assigned or mapped to an interlace. For example, slot 1 is assigned to interlaces 3, 1, 0, 7, 5, 4, etc. over the successive OFDM symbol indices 4, 5, 6, 6, 7, 8, 0, etc. According to one aspect of the disclosure, a slot interlace may refer to an interlace to which a slot is mapped or to be mapped. A pilot interlace may refer to a slot interlace associated with a pilot slot. In another aspect of the disclosure, a slot interlace may refer to a slot to which an interlace is mapped or to be mapped. A pilot interlace may refer to a slot interlace associated with a pilot interlace. In yet another aspect of the disclosure, a slot interlace may refer to a slot-to-interlace map function or an interlace-to-slot map function. A slot-to-interlace map function and an interlace-to-slot map function may be the same or equivalent, except that a slot-to-interlace map function may utilize a slot (or a slot index) as an input and provide an interlace (or an interlace index) as an output and that an interlace-to-slot map function may utilize an interlace (or an interlace index) as an input and provide a slot (or a slot index) as an output. The terms such as a slot, an interlace, a pilot slot, a pilot interlace, a symbol, and the like are sometimes used to refer to a slot index, an interlace index, a pilot slot index, a pilot interlace index, and a symbol index, respectively.

A FLO system is capable of multicasting various services, such as live video and audio streams (e.g., News, Music or Sports channels). A service can be viewed as an aggregation of one or more related data components, such as the video, audio, text or signaling associated with a service. Each FLO service may be carried over one or more logical channels, referred to as Multicast Logical Channels (MLCs). For instance, the video and audio components of a given service may be sent on multiple MLCs (e.g., two different MLCs). One or more slots for data symbols may be used for MLCs. For example, slots 1-3 may be used for video components of a given service, and slots 4-7 may be used for audio components of a given service.

Exemplary systems and methods for a generalized slot-to-interlace map for FLO are described in detail below. Such systems and methods can support a whole family of slot-to-interlace maps in FLO transmitter and receiver devices. Generalized slot-to-interlace maps can provide different length channel estimates that can be computed at a receiver device as well as better Doppler resilience. Generalized slot-to-interlace maps are sometimes referred to as flexible slot-to-interlace maps. A particular slot-to-interlace map may sometimes be referred to by the corresponding pilot staggering pattern used in the slot-to-interlace map.

The FLO air interface specification for 4K mode (TIA-1099) along with its associated implementation can support a staggering pattern referred to as the (2,6) pattern. In this case, the pilot interlace alternates between interlaces 2 and 6 across successive OFDM symbols in a superframe. A (2,6) staggering pattern provides pilot observations from two distinct interlaces 2 and 6. This allows computation of channel estimation up to a length of 1024 in 4K mode operation. While 1024 length channel estimates may suffice for deployments in regions such as the United States, support for longer channel estimates (longer than two pilot interlaces) may be required in other modes of FLO deployment (e.g., 2K mode or VHF band deployment).

Slot-to-interlace map patterns such as those using (0,3,6) and (0,2,4,6) pilot staggering patterns may also be utilized to allow flexibility in channel estimation. These patterns can provide a maximum of 4096 and 2048 length channel estimates, respectively, according to one exemplary implementation. It is also possible to estimate longer channel delay spread (e.g., greater than 4096 and greater than 2048) with higher channel estimation error.

According to one aspect of the disclosure, flexible slot-to-interlace maps may be utilized for OIS and data symbols. TDM pilot (such as TDM Pilot 1 and TDM Pilot 2), WIC, LIC, PPC and SPC symbols may have fixed interlaces independent of the slot-to-interlace map in use for the rest of the superframe. Under normal operating conditions, a FLO receiver device may determine the slot-to-interlace map to be used after decoding the SPC symbols, which occur at the end of the superframe.

Exemplary implementations of generalized slot-to-interlace maps using the (0,3,6), (0,2,4,6) and (2,6) pilot staggering patterns are described in detail below. The slot-to-interlace maps as well as the associated implementations are based on the concept of pilot interlaces and distance vectors for different data slots. The length of a distance vector may be the number of interlaces minus the number of pilot interlaces. In these examples, 8 interlaces and 8 slots are used. However, the subject technology is not limited to these numbers, and any number of interlaces and any number of slots may be utilized.

(0,3,6) Staggering Pattern

A pilot interlace vector ($I_0$) may be determined by the staggering pattern. One or more distance vectors (D) may be defined for each slot-to-interlace map. The distance vectors can be used to determine the interlace index for each data slot. After determining the pilot interlace, data slots may be arranged using the remaining interlaces such that the relative distance of the resulting interlace for a given slot can be obtained from the rotations of the one or more distance vectors. An exemplary implementation of this is described below.

By way of illustration, for the (0,3,6) staggering pattern, $I_0$=[0,3,6,1,4,7,2,5], and let D=[7,2,4,6,1,5,3]. For the (0,3,6) staggering pattern, the pilot jump is 3, and $I_0$ is determined as follows: (i) start with 0 from the staggering pattern, (ii) add the pilot jump of 3 to the initial value 0 to obtain 3 as the next value, (iii) add 3 to obtain 6, (iv) add 3 to obtain 9, which is translated to 1, (v) add 3 to obtain 12, which is translated to 4, (vi) add 3 to obtain 15, which is translated to 7, (vii) add 3 to obtain 18, which is translated to 2, and (viii) add 3 to obtain 21, which is translated to 5. The translation described above may be performed using, for example, the total number of interlaces and a modulo operation.

Let n denote the OFDM symbol index in the superframe, where n goes from 0 through 1199. Note that symbol index 0 corresponds to TDM1. Let s denote the slot index so that s ranges from 0 through 7. Let slot interlace I[s,n] correspond to the interlace to which the slot s is mapped in OFDM symbol index n. Note that s in I[s,n] may take values from 0 through 7. Slot 0 (i.e., s=0) corresponds to the pilot slot for which the interlace is given by the staggering pattern chosen. Thus, slot interlace I[0, n] may be referred to as a pilot interlace.

1. Given the OFDM symbol index n, a pilot interlace (I[0, n]) may be determined by indexing into $I_0$ using n. For example, I[0, n]=$I_0$[(n mod 8)]
2. For the data slots, first compute a rotation factor $R_n$ for the distance vector D based on the OFDM symbol index n. For example, $R_n$=2n mod 7. Then perform a right cyclic shift of the vector D by $R_n$. Let the vector after the right cyclic shift be $D_{R_n}$. Then, the slot-to-interlace map for the data slots in OFDM symbol index n may be given by I[s,n]=(I[0, n]+$D_{R_n}$[s])mod 8, where s=1, 2, . . . , 7.

The resulting map ensures that in a block of 7 successive OFDM symbols, every slot occurs at all the possible distances from the pilot interlace. Furthermore, in a block of 56 successive OFDM symbols, each slot occupies every available interlace exactly 7 times. Each slot goes through all the available interlaces at least once in a window of 17 OFDM symbols. It is also guaranteed that there are at least three intermediate OFDM symbols before a particular interlace is assigned to the same slot.

(2,6) Staggering Pattern

An exemplary generalized slot-to-interlace map based on the (2,6) staggering pattern can be realized using the pilot interlace and distance vectors. In this example, one pilot interlace vector ($I_0$) and two different distance vectors ($D_0$ and $D_1$) are used to realize the entire slot-to-interlace pattern.

By way of illustration, for the (2,6) staggering pattern, $I_0$=[2,6,2,6,2,6,2,6], and let $D_0$=[6,2,4,7,3,1,5] and $D_1$=[2,6,4,3,7,5,1]. Using the notations described above, slot interlace I[s,n], which is the interlace corresponding to slot s in OFDM symbol index n, can be determined as follows:

1. Given the OFDM symbol index n, a pilot interlace (I[0, n]) may be determined by indexing into $I_0$ using n. For example, I[0,n]=$I_0$[(n mod 8)]
2. If n is even, set D to be $D_0$. If n is odd, set D to be $D_1$.
3. For the data slots, first compute a rotation factor $R_n$ for the distance vector D based on the OFDM symbol index n. For example, $R_n$=2n mod 7. Then perform a right cyclic shift of the distance vector D by $R_n$. Let the vector after the right cyclic shift be $D_{R_n}$. Then, the slot-to-interlace map for the data slots in the OFDM symbol index n may be given by I[s,n]=(I[0,n]+$D_{R_n}$[s])mod 8, where s=1, 2, . . . , 7.

Notice that with two distance vectors, there is an additional step of selecting the appropriate distance vector based on the OFDM symbol index n. In order to generalize the structure, eight distinct distance vectors may be used for any pilot interlace vector. In addition, two interlace pilot staggering patterns can also be generated using the same structure, where the pilot interlace and distance vectors may be chosen appropriately in software.

(0,2,4,6) Staggering Pattern

An exemplary generalized slot-to-interlace map based on the (0,2,4,6) staggering pattern can be realized using a pilot interlace and a distance vector. In this example, a pilot interlace vector ($I_0$) and a distance vector (D) are used to realize the entire slot-to-interlace pattern.

By way of illustration, for the (0,2,4,6) staggering pattern, $I_0$=[0,2,4,6,0,2,4,6], and let D=[1,6,4,2,7,5,3]. Using the notations described above, slot interlace I[s,n] can be determined as follows:

1. Given the OFDM symbol index n, a pilot interlace (I[0, n]) may be determined by indexing into $I_0$ using n. For example, I[0, n]=$I_0$[(n mod 8)]
2. For the data slots, first compute a rotation factor $R_n$ for the distance vector D based on the OFDM symbol index n. For example, $R_n=2n$ mod 7. Then perform a right cyclic shift of the distance vector D by $R_n$. Let the vector after the right cyclic shift be $D_{R_n}$. Then, the slot-to-interlace map for the data slots in the OFDM symbol index n may be given by $I[s,n]=(I[0, n]+D_{R_n}[s])$mod 8, where $s=1, 2, \ldots, 7$.

For this exemplary implementation, each slot (except for a pilot slot) is assigned to every interlace at least once in every 10 successive OFDM symbols. An interlace is repeated for a slot only after three OFDM symbols. Given the distance vector of length 7, every slot occupies all the possible distances from the pilot interlace in a block of 7 successive OFDM symbols. Furthermore, in a block of 28 successive OFDM symbols, each slot occupies interlaces 0, 2, 4 and 6 three times and interlaces 1, 3, 5 and 7 four times.

Referring back to FIG. 6, this concept is explained in detail. For the (0,2,4,6) staggering pattern described above, each of slots 1 through 7 is assigned to each of interlaces 0, 1, 2, 3, 4, 5, 6, and 7 at least once in every 10 successive OFDM symbols. For example, slot 1 is assigned to interlace 3 for OFDM symbol index 4, is assigned to interlace 1 for OFDM symbol index 5, is assigned to interlace 0 for OFDM symbol index 6, is assigned to interlace 7 for OFDM symbol index 7, is assigned to interlace 5 for OFDM symbol index 8, is assigned to interlace 4 for OFDM symbol index 9, is assigned to interlace 2 for OFDM symbol index 10, is assigned to interlace 1 for OFDM symbol index 11, is assigned to interlace 7 for OFDM symbol index 12, and is assigned to interlace 6 for OFDM symbol index 13.

Still referring to FIG. 6, an interlace index is repeated for a slot only after 3 symbols. For example, for slot 0, interlace 0 is repeated only after 3 successive OFDM symbols indices. This is the same for interlace 2, interlace 4 and interlace 6. Furthermore, FIG. 6 illustrates that every slot occupies all the possible distances from the pilot interlace in 7 successive OFDM symbols. For example, slot 0 is for the pilot interlace, and is assigned to interlaces 0, 2, 4, 6, 0, 2, and 4 for OFDM symbol indices 4, 5, 6, 7, 8, 9, and 10, respectively. Slot 3 is assigned to interlaces 6, 5, 3, 2, 1, 7, and 6 for OFDM symbol indices 4, 5, 6, 7, 8, 9, and 10, respectively. Thus, the distance between slot 3 and slot 0 is the absolute value of the difference between the interlace indices of slot 3 and slot 0. In this example, the distance is 6, 3, 7 (which is a translation of −1), 4 (which is a translation of −4), 1, 5, and 2 for OFDM symbol indices 4, 5, 6, 7, 8, 9, and 10, respectively. The absolute value can be obtained, for example, by performing a modulo operation.

According to one aspect of the disclosure, one or more pilot interlace vectors (e.g., $I_0, I_1, I_2$, etc.) may be utilized, and one or more distance vectors (e.g., $D_0, D_1, D_2$, etc.) may be utilized. The number of slots and the number of interlaces are not limited to 8, and each of them may be any number. Thus, there may be p number of slots, and q number of interlaces. The variables p and q may be the same. The length of each of the pilot interlace vectors may be q. An exemplary implementation may be described as follows:

1. Given the OFDM symbol index n, a pilot interlace vector I may be selected from the one or more pilot interlace vectors based on, for example, n. A pilot interlace may be determined by indexing into the selected I using n. For example, $I[0,n]=I[(n$ mod $m1)]$, where m1 is any integer. It is also possible that there may be more than one pilot interlace. For example, pilot interlaces may be expressed as follows: $I[x,n]=I[(n$ mod $m1)]$, where x may represent indices of pilot slots. The indices for pilot slots do not need to be contiguous. For instance, pilot slots may occupy slot 1, slot 3 and slot 7, in which case $x=1, 3, 7$.

2. Given the OFDM symbol index n, a distance vector D may be selected from the one or more distance vectors based on n (e.g., based on n mod m2, where m2 is any integer) and/or optionally the pilot interlace selected in step 1 above.

3. For the data slots, first compute a rotation factor $R_n$ for the distance vector D based on the OFDM symbol index n. For example, $R_n=k*n$ mod m3, where each of k and m3 is an integer. Then perform a right cyclic shift of the distance vector D by $R_n$. Let the vector after the right cyclic shift be $D_{R_n}$. Then, the slot-to-interlace map for the data slots in the OFDM symbol index n may be given by $I[s,n]=(I[0,n]+D_{R_n}[s])$mod m4, where $s=1, 2, \ldots, p-1, p$, m4 is any integer. If there are multiple pilot interlaces such as $I[x,n]$, then the slot-to-interlace map may be expressed as: $I[s,n]=(I[x,n]+D_{R_n}[s])$mod m4, where s may represent the indices of non-pilot slots (e.g., data slots). The variables k, m1, m2, m3 and m4 may be the same or different. It is also possible that there may be more than one rotation factor.

According to one aspect of the disclosure, one or more (or all) of the following properties may be associated with generalized slot-to-interlace mapping:

1. An interlace is associated with non-contiguous subcarriers (e.g., I0 is associated with non-contiguous subcarrier indices 48, 56, etc., as shown in FIG. 5).
2. Each of the slots occupies as many different interlaces as possible over a set of successive symbols. For example, in FIG. 6, slot 2 occupies interlaces 1, 7, 6, 4, and 3 over successive symbol indices 4, 5, 6, 7, and 8. Thus, each slot may occupy every available interlace over a set of successive symbols, and the slot-to-interlace assignment may change over time.
3. Every slot occupies all the possible distances from a pilot interlace over a set of successive symbols. The number of successive symbols in the set may be the number of interlaces minus the number of pilot interlaces. For example, in FIG. 6, the distance between slot 6 (data slot) and slot 0 (pilot slot) is 7, 4, 1, 5, 2, 6, and 3 over symbol indices 4, 5, 6, 7, 8, 9, and 10. Thus, slot 6 occupies all the possible distances (1 through 7) from the pilot interlace over six successive symbols.
4. Each slot is assigned to the same interlace only after a pre-determined number of successive symbols. In other words, an interlace index is repeated for a given slot only after a pre-determined number of successive symbols. For example, in FIG. 6, slot 0 is assigned to interlace 0 again only after three successive symbols.

Hardware Implementation Architecture

Figure 7:
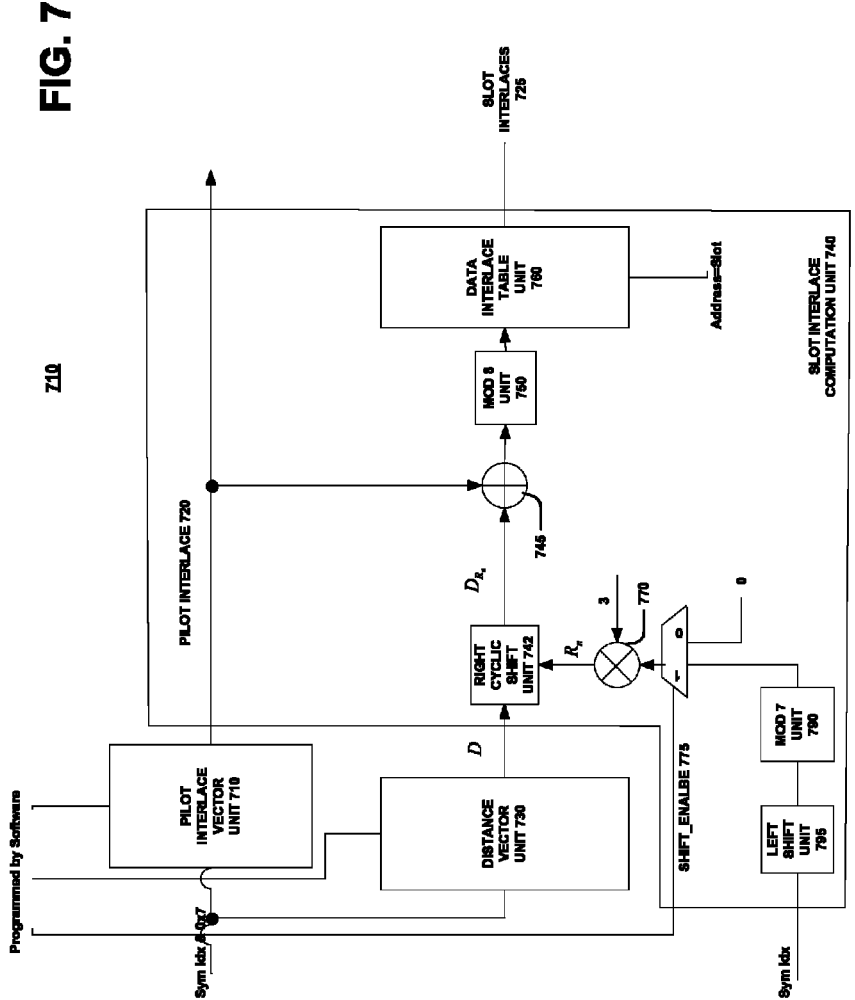
FIG. 7 is a conceptual block diagram illustrating an exemplary hardware implementation architecture for generalized slot-to-interlace maps.

FIG. 7 is a conceptual block diagram illustrating exemplary hardware implementation architecture for generalized slot-to-interlace maps. A processing system 710 of a transmitter or receiver device may include a pilot interlace vector unit 710, a distance vector unit 730, and a slot interlace computation unit 740. In this exemplary implementation, 8 slots and 8 interlaces are used, but the subject technology is not limited to these numbers of slots and interlaces.

Various parameters required for computing the slot-to-interlace map such as the pilot interlace vector, distance vectors and other control parameters like shift_enable may be programmed by the software to allow easy programmability in the mapping used. The software may be able to directly program the hardware registers (e.g., the pilot interlace vector unit 710 and the distance vector unit 730) that contain some of these parameters. These parameters may be programmed at power up (based on default parameters) or after processing the SPC symbols. In addition, the hardware is awake when the software attempts to program these registers. Since the hardware sleep timeline is available in software, the software can readily handle sleep-related issues. Providing the direct control to software may ensure that OIS decoding is enabled at the appropriate time in software. OIS decoding may be enabled after the slot-to-interlace parameters are programmed in the hardware.

The pilot interlace vector unit 710 may include a pilot interlace vector $I_0$ that includes, for example, an 8×1 vector programmed by the software. Each element of the vector may be 3 bits long (to represent one of eight interlaces from 000 to 111). For staggering patterns such as (2,6), the pattern may be repeated periodically until all eight elements in the vector are used up. For example, a (2,6) staggering pattern may generate a pilot interlace vector $I_0$ of (2,6,2,6,2,6,2,6). A (0,3,6) staggering pattern may generate a pilot interlace vector $I_0$ of (0,3,6,1,4,7,2,5). A (0,2,4,6) staggering pattern may generate a pilot interlace vector $I_0$ of (0,2,4,6,0,2,4,6).

Software can also program the distance vector unit 730, which includes, for example, an 8×7 distance vector table. Each entry in this table may be represented using three bits. As a result, the table may include 8 rows, each of length 21 bits. Each row of this table corresponds to one distance vector. As in the case of pilot interlace vector, if the number of distance vectors is less than 8, then the distance vectors are repeated periodically to fill up the entire table. Therefore, in the case of (0,3,6) pattern, one vector is repeated 8 times to fill up the table. In the case of (2,6) staggering pattern, where there are two distinct distance vectors, each distance vector occurs four times in alternate locations in the table. Software can handle the periodic repetitions while writing to the tables.

A shift_enable flag 775 (1 bit) can be used by the hardware to enable or disable the cyclic rotation of the distance vector based on the OFDM symbol index. The shift_enable flag 775 may be also initialized by the software while initializing the pilot interlace vector and the distance vectors.

After all the software programming is complete, the hardware operations may be performed as follows. Note that OFDM symbol index n in the following description corresponds to the OFDM symbol index in the superframe. Hardware first uses the OFDM symbol index n for which the slot-to-interlace map is to be generated, selects the three least significant bits (LSBs) (modulo 8 operation), and uses the three LSBs to index into the pilot interlace vector to obtain the pilot interlace. To save register space, the pilot interlace vector may be stored in a packet format using 8×3=24 bits in a 32 bit register. The format may be such that the pilot interlace for OFDM symbol index 0 occupies the least significant 3 bits. The pilot interlace may be given by the three bits in the vector which occupy the positions (n mod 8)*3, (n mod 8)*3+1 and (n mod 8)*3+2. Let this be denoted by I[0,n].

The OFDM symbol index n may also be used to index into the distance vector as well as the rotation factor that is used on the distance vector. The shift_enable flag 775, which is set by the software (depending on the slot-to-interlace map being used), can determine if a non-zero rotation is to be used on the distance vector. If the shift_enable flag 775 is set, then the OFDM symbol index n is first shifted to the left by 1 using a left shift unit 795 (multiplication by 2), and then a modulo 7 operation is performed on the result using a modulo 7 unit 790. A multiplier 770 multiplies the result by 3 (to account for 3 bits used by each entry in the distance vector table) to arrive at $R_n$, which is used as an argument for a right cyclic shift unit 742.

The OFDM symbol index n may also be used to select the appropriate distance vector row in the distance vector matrix. For example, the three LSBs of the OFDM symbol index (e.g., n mod 8) can be used as the row index to select the distance vector to result in D. The distance vector D is then cyclically shifted to the right by the argument given by $R_n$ to arrive at $D_{R_n}$. In this particular example, because vector D occupies only 24 bits in a 32 bit register, the cyclic shift operation needs to take that into account. Alternatively, to simplify the hardware operation, the software can perform a cyclic extension of the 24 bit vector to 32 bits by placing the 8 LSBs at the front. Such an extended vector can help in the cyclic shift operation for the hardware. In such a case, $D_{R_n}$ corresponds to the 24 LSBs of the cyclically shifted vector.

The slot interlaces 725 for data slots 1 through 7 in the OFDM symbol index n can be obtained as follows. The pilot interlace I[0,n] that was obtained previously can be added to the three LSBs of $D_{R_n}$ using an adder 745. Then a modulo 8 operation can be performed on the result using a modulo 8 unit 750. The result may be placed into a data interlace table unit 760, which may include a 1×7 vector. Each element of the vector may be 3 bits long. The first result may be a slot interlace corresponding to slot 1. In general for slot s, the interlace index is given by the operation $(I[0,n]+D_{R_n}(3s-3:3s-1))$ mod 8. Note that in $D_{R_n}(x: y)$ corresponds to bit locations x, x−1, . . . , y in the above expression.

The interlace indices obtained for all the seven data slots and the pilot slot may be stored in a look up table (not shown) that can then be indexed using the slot index.

A processing system 710 shown in FIG. 7 may be also utilized to map an interlace to a slot when OFDM symbols are received. The pilot interlace 720 may provide a pilot slot(s) for a given pilot interlace(s), and the slot interlaces 725 may provide a slot(s) for a given interlace(s). The processing system 710 may be pre-programmed with one or more pilot interlace vectors, one or more distance vectors and optionally one or more rotation factors. Alternatively, the processing system 710 may receive some or all of these via other suitable means (e.g., a FLO network, other type of network, other type of communication). For a given symbol index and an interlace (s), the processing system 710 may provide the corresponding slot(s) using a slot interlace computation unit. Also, for a give symbol index and a pilot interlace(s), the processing system 710 may provide the corresponding pilot slot(s) using the slot interlace computation unit. The implementation of the slot interlace computation unit may be similar to or different than the implementation of the slot interlace computation unit 740.

Modulo 7 Implementation in Hardware

An exemplary modulo 7 operation that may be used in a slot-to-interlace map implementation is explained in detail below. For example, a 2n mod 7 operation may be performed where n is the OFDM symbol index in the superframe. According to one exemplary configuration, a modulo 7 operation is performed using adders only. A basic concept is described below.

It is known that 8≡1 (mod 7). Therefore, any power of 8 is also congruent to 1 modulo 7. In other words, for any integer m, $8^m \equiv 1$ (mod 7). Based on this concept of congruency and expansion of any number in powers of 8, 3m bit positive integer k can be expressed as $k=8^{m-1}p_{m-1}+8^{m-2}p_{m-2}+ \ldots +8^1 p_1+p_0$, using suitable integers. This equation can be written using modulo 7 as, $k \equiv p_{m-1}+p_{m-2}+ \ldots +p_1+p_0$ (mod 7). Each $p_i$ represents three consecutive bits at the location (3i+2:3i) in the binary representation of k. Therefore, successive three bits in the form of (3i+2:3i) can be added up until the final result is reduced to 3 bits.

According to one exemplary aspect of the disclosure, this technique can be applied to the OFDM symbol index n in the superframe as follows. Note that when the OFDM symbol index n is a 11 bit number in a FLO system across all bandwidths, 2n is a 12 bit number.

1. First, group bits (0-2), (3-5), (6-8), and (9-11), and then add them up to result in a 5 bit number.
2. Next, group the resulting 5 bit number again as bits (0-2) and (3-4), and then add them up to result in a 4 bit number.
3. At this stage, the resulting number is guaranteed to be between 0 and 8 (decimal). A look up table may be used at this stage, or one last addition may be performed. If an addition is performed, then step 4 below is performed next.
4. Add bit 4 to the 3 LSBs. The result is guaranteed to be between 0 and 7.
5. If the number is 7, then map it back to 0 (since 7 is 0 modulo 7). If the result is less than 7, use the result as is.

This implementation uses 6 adders. It is also possible to use a higher power of 8 (e.g., 64) and reduce the operations to 2 additions. A look up table may be used to map it back to the final result modulo 7.

According to another exemplary aspect of the disclosure, a modulo 7 operation may be performed in the following manner.

1. Given that the OFDM symbol index n is expressed using, for example, 2's complimentary binary representation, and that 2n is a $k_1$-bit long number, select the size (m bits) of a group, where m is greater than or equal to 2, and m is less than $k_1$, m is an integer, and $k_1$ is an integer.
2. Based on the size (m bits) of the group, determine the number ($n_1$) of the groups for the $k_1$-bit long number, where each of the groups is m-bits long, $n_1$ is an integer, and the groups are represented as group 1 through group $n_1$. $n_1$ can be roundup ($k_1$/m).
3. Group the $k_1$-bit long number into group 1 through group $n_1$, starting from the least significant bit(s) of the $k_1$-bit long number so that group 1 is associated with the least significant bit(s) of the $k_1$-bit long number.
4. Add group 1 through group $n_1$ to generate a $k_2$-bit long number, where $k_2$ is less than $k_1$, and $k_2$ is an integer.
5. Determine the number ($n_i$) of $i^{th}$ groups for the $k_i$-bit long number, where each of the $i^{th}$ groups is m-bits long, i is an integer, i is greater than 1, and the $i^{th}$ groups are represented as $i^{th}$ group 1 through $i^{th}$ group $n_1$. $n_i$ can be roundup ($k_i$/m).
6. Group the $k_i$-bit long number into the $i^{th}$ group 1 through the $i^{th}$ group $n_1$, where the $i^{th}$ group 1 is associated with the least significant bit(s) of the $k_i$-bit long number.
7. Add the $i^{th}$ group 1 through the $i^{th}$ group $n_i$ to generate a $k_1$-bit long number, where $k_{i+1}$ is less than $k_i$, and $k_{i+1}$ is an integer.
8. Increment i.
9. Repeat steps 5 through 8, until $k_{i+1}$ is equal to or less than m.
10. If $k_{i+1}$ is equal to or less than m, and m is 3, then step 9 can provide the final desired result. If m is greater than 3 (e.g., 6), then a look up table may be used at this stage. Alternatively, steps similar to steps 5 through 8 may be repeated with m being, for example, 3.
11. If the resulting number is 7, then map it back to 0 (since 7 is 0 modulo 7). If the result is less than 7, use the result as is.

Now returning to FIG. 2, in an exemplary process, the receiver 202 of the receiver device 200 may receive a signal. The demodulator 204 may perform demodulation on the received signal and provide OFDM symbols to the processing system 206, which may separate the OFDM symbols into interlaces and map the interlaces into slots using one or more pilot interlaces and one or more slot interlaces. The processing system 206 may further generate modulation symbols from the slots and convert the modulation symbols to data streams.

Referring to FIG. 3, in an exemplary process, the transmitter device 302 may receive data streams and convert the data streams to symbols. The processing system 314 of the transmitter device 302 may assign the symbols into slots and map the slots into interlaces using one or more pilot interlaces and one or more slot interlaces. The modulator 320 may perform modulation to generate a modulated signal, and the transmitter 322 may transmit the modulated signal.

Figure 8:
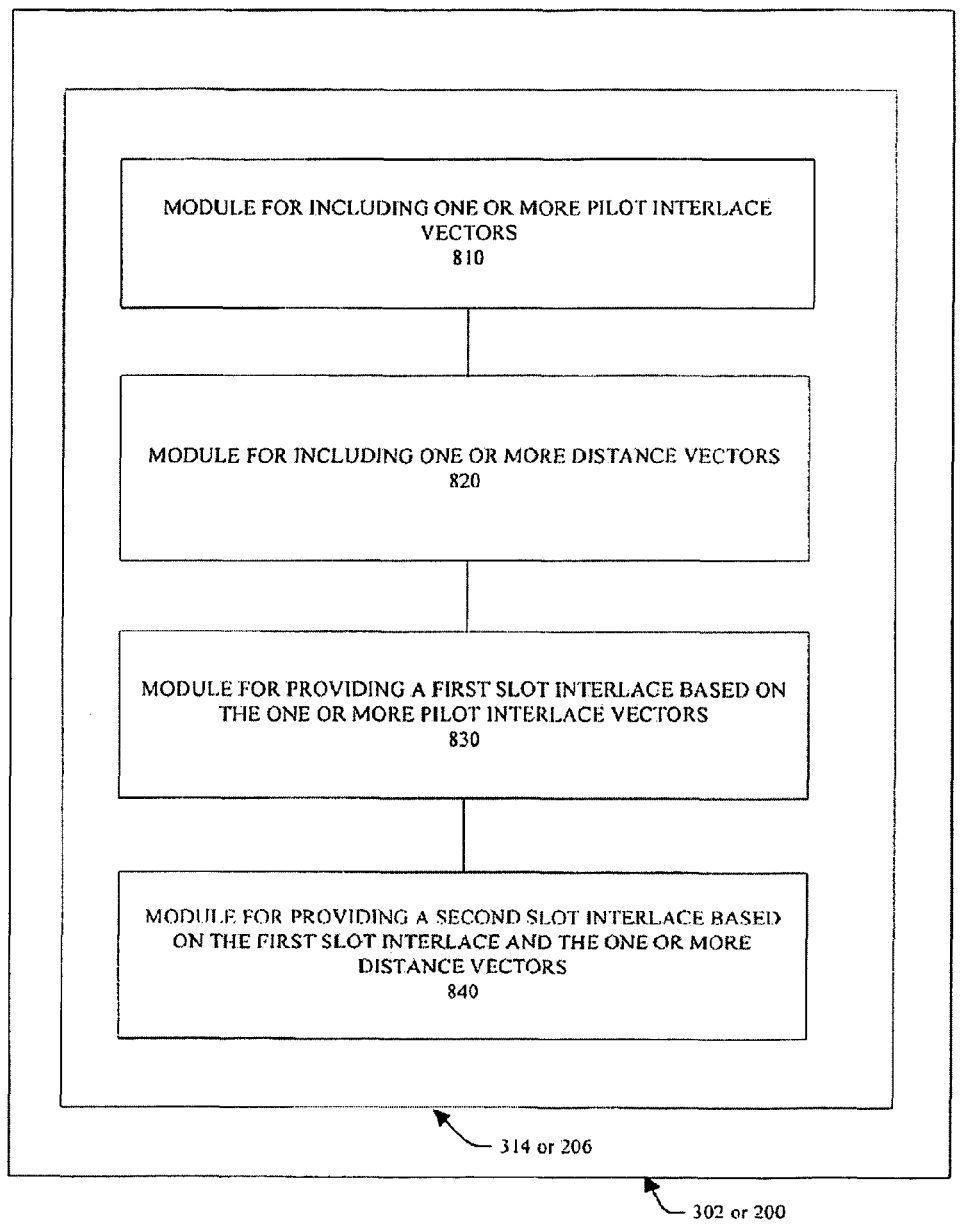
FIG. 8 is a conceptual block diagram illustrating an example of the functionality of a processing system in a transmitter or receiver device.

FIG. 8 is a conceptual block diagram illustrating an example of the functionality of a processing system in a transmitter or receiver device. A processing system 314 or 206 of a transmitter or receiver device 302 or 200 (see FIGS. 2 and 3) includes a module 810 for including one or more pilot interlace vectors and a module 820 for including one or more distance vectors. The processing system 206 or 314 also includes a module 830 for providing a first slot interlace based on the one or more pilot interlace vectors and a module 840 for providing a second slot interlace based on the first slot interlace and the one or more distance vectors.

Figure 9:
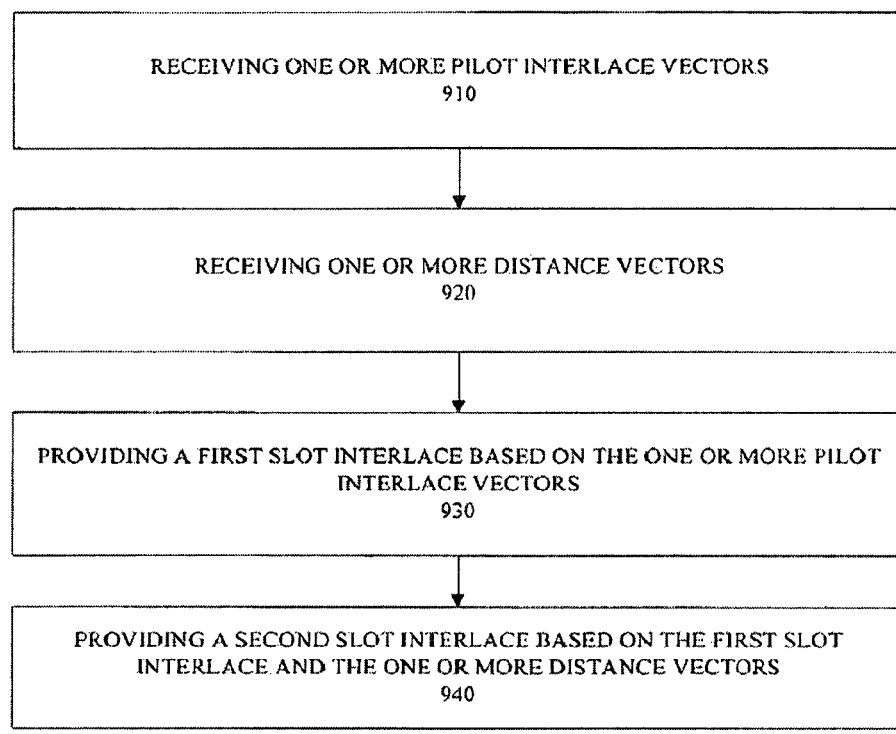
FIG. 9 is a flow chart illustrating an exemplary operation of providing slot interlaces or providing communication at a transmitter or receiver device.

FIG. 9 is a flow chart illustrating an exemplary operation of providing slot interlaces or providing communication at a transmitter or receiver device. In step 910, a processing system 314 or 206 of a transmitter or receiver device 302 or 200 (see FIGS. 2 and 3) may receive one or more pilot interlace vectors. In step 920, the processing system 314 or 206 may receive one or more distance vectors. In step 930, it may provide a first slot interlace based on the one or more pilot interlace vectors. In addition, in step 940, the processing system 314 or 206 may provide a second slot interlace based on the first slot interlace and the one or more distance vectors. A readable medium may be encoded or stored with instructions executable by a transmitter or receiver device, or by a processing system of such a device, where the instructions include code for the steps 910, 920, 930 and 940 described above.

As described above, hardware architecture can be used to implement a family of slot-to-interlace maps through the configuration of some hardware registers. The architecture can support slot-to-interlace maps with different pilot staggering patterns. Channel estimation ability and Doppler resilience depend on the pilot staggering pattern in an OFDM system such as FLO. With the architecture described above, a single FLO receiver device can support different slot-to-interlace maps that may be deployed in different networks. The architecture also supports backward compatibility with the FLO air interface specification.

According to one aspect of the disclosure, it may be desirable for the pilot observations obtained from multiple OFDM symbols to correspond to as many distinct subcarriers as possible to ensure a channel estimate that satisfies the delay spread requirements of the communication system. In addition to the pilot symbols spanning a wide array of subcarriers, it may be also desirable for the data symbols to be interspersed among both the pilot subcarriers as well as the total available set of subcarriers in the OFDM system so that the data symbols may enjoy the benefits of channel estimation as well as frequency diversity. Therefore, slot-to-interlace maps play a vital role in OFDM systems.

The hardware and software implementations presented above are exemplary implementations. The subject technology is not limited to these implementations, and other suitable implementations may be used. The subject technology is also not limited to a FLO system, and it may be used in a variety of communications systems. While staggering patterns (2,6), (0,3,6) and (0,2,4,6) are described above, these are merely examples, and the subject technology is not limited to these examples. The descriptions related to OFDM symbols and OFDM symbol index may be applicable to other symbols and symbol index. The term "symbol" used herein may refer to an OFDM symbol, any other type of symbol, data, or information. The term "vector" used herein may refer to an array, a group, a set, or a plurality of items. The term "map" used herein may refer to assign or allocate, and vice versa.

Those of skill in the art would appreciate that the various illustrative components, blocks, modules, elements, networks, devices, processing systems, methods, systems, and algorithms described herein may be implemented in hardware, software, or a combination of both. For example, a component may be, but is not limited to being, a process running on a processor, an object, an executable, a thread of execution, a program, and/or a computer. By way of illustration, both an application running on a communications device and the device can be a component. One or more components may reside within a process and/or thread of execution, and a component may be localized on one computer and/or distributed between two or more computers. In addition, these components can execute from various readable media having various data structures stored thereon. The components may communicate over local and/or remote processes such as in accordance with a signal having one or more data packets (e.g., data from one component interacting with another component in a local system, distributed system, and/or across a wired or wireless network such as the Internet).

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Underlined and/or italicized headings and subheadings are used for convenience only, do not limit the disclosure, and are not referred to in connection with the interpretation of the disclosure.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include" or "have" is used in either the description or the claims, such term is intended to be inclusive in a manner similar to the term "comprising" as "comprising" is interpreted when employed as a transitional word in a claim.

What is claimed is:

1. A transmitter or receiver device, comprising: a processing system configured to include one or more pilot interlace vectors determined by at least one staggering pattern and one or more distance vectors for a slot-to-interlace map, wherein the one or more distance vectors are used to determine an interlace index for each data slot of the slot-to-interlace map, and wherein a length of the one or more distance vectors is a number of interlaces in the slot-to-interlace map minus a number of the one or more pilot interlace vectors, the processing system further configured to provide a first slot interlace based on the one or more pilot interlace vectors, the processing system further configured to provide a second slot interlace based on the first slot interlace and the one or more distance vectors.

2. The transmitter or receiver device of claim 1, wherein the processing system is further configured to provide the first slot interlace based on the one or more pilot interlace vectors and a symbol index.

3. The transmitter or receiver device of claim 1, wherein the one or more distance vectors include a plurality of distance vectors, and the processing system is further configured to select a distance vector from the plurality of distance vectors based on a symbol index.

4. The transmitter or receiver device of claim 3, wherein the processing system is further configured to provide the second slot interlace based on the first slot interlace and the selected distance vector.

5. The transmitter or receiver device of claim 3, wherein the one or more pilot interlace vectors include a plurality of pilot interlace vectors, the processing system is further configured to select a pilot interlace vector from the plurality of pilot interlace vectors based on a symbol index, and the processing system is further configured to select the distance vector from the plurality of distance vectors based on the symbol index and the selected pilot interlace.

6. The transmitter or receiver device of claim 1, wherein the first slot interlace includes one or more pilot interlaces, and the second slot interlace includes one or more slot interlaces for data.

7. The transmitter or receiver device of claim 1, wherein the processing system is further configured to rotate the one or more distance vectors to provide the second slot interlace.

8. The transmitter or receiver device of claim 1, wherein the processing system is further configured to select a pilot interlace vector from the one or more pilot interlace vectors based on a symbol index.

9. The transmitter or receiver device of claim 1, wherein the first slot interlace is for a first slot, the second slot interlace is for a second slot, and the processing system is further configured to provide additional slot interlaces for all other slots based on the first slot interlace and the one or more distance vectors.

10. The transmitter or receiver device of claim 1, wherein the processing system is further configured to determine the length of a channel estimate of a transmit or receive channel.

11. The transmitter or receiver device of claim 1, wherein the second slot interlace is configured to map a slot into one or more interlaces or map an interlace into one or more slots, and wherein a symbol corresponds to one or more MAC time units, or a MAC time unit corresponds to one or more symbols.

12. A transmitter or receiver device, comprising:
means for including one or more pilot interlace vectors determined by at least one staggering pattern;
means for including one or more distance vectors for a slot-to-interlace map, wherein the one or more distance vectors are used to determine an interlace index for each data slot of the slot-to-interlace map, and wherein a length of the one or more distance vectors is a number of interlaces in the slot-to-interlace map minus a number of the one or more pilot interlace vectors;
means for providing a first slot interlace based on the one or more pilot interlace vectors; and
means for providing a second slot interlace based on the first slot interlace and the one or more distance vectors.

13. The transmitter or receiver device of claim 12, wherein the means for providing the first slot interlace is configured to provide the first slot interlace based on the one or more pilot interlace vectors and a symbol index.

14. The transmitter or receiver device of claim 12, wherein the one or more distance vectors include a plurality of distance vectors, and the transmitter or receiver device further comprises means for selecting a distance vector from the plurality of distance vectors based on a symbol index.

15. The transmitter or receiver device of claim 14, wherein the means for providing the second slot interlace is configured to provide the second slot interlace based on the first slot interlace and the selected distance vector.

16. The transmitter or receiver device of claim 14, wherein the one or more pilot interlace vectors include a plurality of pilot interlace vectors, and wherein the transmitter or receiver device further comprises:
means for selecting a pilot interlace vector from the plurality of pilot interlace vectors based on a symbol index; and
means for selecting the distance vector from the plurality of distance vectors based on the symbol index and the selected pilot interlace.

17. The transmitter or receiver device of claim 12, wherein the first slot interlace includes one or more pilot interlaces, and the second slot interlace includes one or more slot interlaces for data.

18. The transmitter or receiver device of claim 12, further comprising means for rotating the one or more distance vectors to provide the second slot interlace.

19. The transmitter or receiver device of claim 12, further comprising means for selecting a pilot interlace vector from the one or more pilot interlace vectors based on a symbol index.

20. The transmitter or receiver device of claim 12, wherein the first slot interlace is for a first slot, and the second slot interlace is for a second slot, and wherein the transmitter or receiver device further comprises means for providing additional slot interlaces for all other slots based on the first slot interlace and the one or more distance vectors.

21. The transmitter or receiver device of claim 12, further comprising means for determining the length of a channel estimate of a transmit or receive channel.

22. The transmitter or receiver device of claim 12, wherein the second slot interlace is configured to map a slot into one or more interlaces or map an interlace into one or more slots, and wherein a symbol corresponds to one or more MAC time units, or a MAC time unit corresponds to one or more symbols.

23. A method of providing slot interlaces or providing communication at a transmitter or receiver device, comprising:
receiving, in the transmitter or receiver, one or more pilot interlace vectors determined by at least one staggering pattern;
receiving, in the transmitter or receiver, one or more distance vectors for a slot-to-interlace map, wherein the one or more distance vectors are used to determine an interlace index for each data slot of the slot-to-interlace map, and wherein a length of the one or more distance vectors is a number of interlaces in the slot-to-interlace map minus a number of the one or more pilot interlace vectors;
providing, in the transmitter or receiver, a first slot interlace based on the one or more pilot interlace vectors; and
providing, in the transmitter or receiver, a second slot interlace based on the first slot interlace and the one or more distance vectors.

24. The method of claim 23, wherein the step of providing the first slot interlace comprises providing the first slot interlace based on the one or more pilot interlace vectors and a symbol index.

25. The method of claim 23, wherein the one or more distance vectors include a plurality of distance vectors, and the method further comprises selecting a distance vector from the plurality of distance vectors based on a symbol index.

26. The method of claim 25, wherein the step of providing the second slot interlace comprises providing the second slot interlace based on the first slot interlace and the selected distance vector.

27. The method of claim 25, wherein the one or more pilot interlace vectors include a plurality of pilot interlace vectors, wherein the method further comprises:
selecting a pilot interlace vector from the plurality of pilot interlace vectors based on a symbol index; and
selecting the distance vector from the plurality of distance vectors based on the symbol index and the selected pilot interlace.

28. The method of claim 23, wherein the first slot interlace includes one or more pilot interlaces, and the second slot interlace includes one or more slot interlaces for data.

29. The method of claim 23, further comprising rotating the one or more distance vectors to provide the second slot interlace.

30. The method of claim, further comprising selecting a pilot interlace vector from the one or more pilot interlace vectors based on a symbol index.

31. The method of claim 23, wherein the first slot interlace is for a first slot, and the second slot interlace is for a second slot, and wherein the method further comprises providing additional slot interlaces for all other slots based on the first slot interlace and the one or more distance vectors.

32. The method of claim 23, further comprising determining the length of a channel estimate of a transmit or receive channel.

33. The method of claim 23, wherein the second slot interlace maps a slot into one or more interlaces or maps an interlace into one or more slots, and wherein a symbol corresponds to one or more MAC time units, or a MAC time unit corresponds to one or more symbols.

34. The method of claim 23, wherein the step of providing the second slot interlace comprises:
representing two times a symbol index as a $k_1$-bit long number, wherein $k_1$ is an integer;
determining $n_1$ number of $1^{st}$ groups for the $k_1$-bit long number, wherein each of the $1^{st}$ groups is m-bits long, m is greater than or equal to 2, m is less than $k_1$, m is an integer, $n_1$ is an integer, and the $1^{st}$ groups are represented as $1^{st}$ group 1 through $1^{st}$ group $n_1$;

grouping the $k_1$-bit long number into the $1^{st}$ group 1 through the $1^{st}$ group $n_1$; and adding the $1^{st}$ group 1 through the $1^{st}$ group $n_1$ to generate a $k_2$-bit long number, wherein $k_2$ is less than $k_1$, and $k_2$ is an integer.

35. The method of claim 34, wherein the step of providing the second slot interlace further comprises:

determining $n_i$ number of $i^{th}$ groups for the $k_1$-bit long number, wherein each of the $i^{th}$ groups is m-bits long, i is an integer, i is greater than 1, and the $i^{th}$ groups are represented as $i^{th}$ group 1 through $i^{th}$ group $n_i$;

grouping the $k_1$-bit long number into the $i^{th}$ group 1 through the $i^{th}$ group $n_i$;

adding the $i^{th}$ group 1 through the $i^{th}$ group $n_i$ to generate a $k_{i+1}$-bit long number, wherein $k_{i+1}$ is less than $k_i$, and $k_{i+1}$ is an integer;

incrementing i; and repeating the steps of determining $n_i$ number of $i^{th}$ groups, grouping the $k_i$-bit long number, adding the $i^{th}$ group 1 through the $i^{th}$ group $n_i$, and incrementing i, until $k_{i+1}$ is equal to or less than m.

36. The method of claim 23, further comprising:
converting data streams to symbols;
assigning the symbols into slots;
mapping the slots into interlaces using the first slot interlace and the second slot interlace, wherein the first slot interlace includes one or more pilot interlaces, and the second slot interlace includes one or more slot interlaces for data;
performing modulation;
generating a modulated signal; and
transmitting the modulated signal.

37. The method of claim 23, further comprising:
obtaining symbols;
separating the symbols into interlaces;
mapping the interlaces into slots using the first slot interlace and the second slot interlace, wherein the first slot interlace includes one or more pilot interlaces, and the second slot interlace includes one or more slot interlaces for data;
generating modulation symbols from the slots; and
converting the modulation symbols to data streams.

38. A readable storage medium comprising instructions executable by a transmitter or receiver device, the instructions comprising code for:

receiving one or more pilot interlace vectors determined by at least one staggering pattern;

receiving one or more distance vectors for a slot-to-interlace map, wherein the one or more distance vectors are used to determine an interlace index for each data slot of the slot-to-interlace map, and wherein a length of the one or more distance vectors is a number of interlaces in the slot-to-interlace map minus a number of the one or more pilot interlace vectors;

providing a first slot interlace based on the one or more pilot interlace vectors; and providing a second slot interlace based on the first slot interlace and the one or more distance vectors.

39. The readable storage medium of claim 38, wherein the code for providing the first slot interlace comprises code for providing the first slot interlace based on the one or more pilot interlace vectors and a symbol index.

40. The readable storage medium of claim 38, wherein the one or more distance vectors include a plurality of distance vectors, and the instructions further comprise code for selecting a distance vector from the plurality of distance vectors based on a symbol index.

41. The readable storage medium of claim 40, wherein the code for providing the second slot interlace comprises code for providing the second slot interlace based on the first slot interlace and the selected distance vector.

42. The readable storage medium of claim 40, wherein the one or more pilot interlace vectors include a plurality of pilot interlace vectors, wherein the instructions further comprise code for:

selecting a pilot interlace vector from the plurality of pilot interlace vectors based on a symbol index; and selecting the distance vector from the plurality of distance vectors based on the symbol index and the selected pilot interlace.

43. The readable storage medium of claim 38, wherein the first slot interlace includes one or more pilot interlaces, and the second slot interlace includes one or more slot interlaces for data.

44. The readable storage medium of claim 38, wherein the instructions further comprise code for rotating the one or more distance vectors to provide the second slot interlace.

45. The readable storage medium of claim 38, wherein the instructions further comprise code for selecting a pilot interlace vector from the one or more pilot interlace vectors based on a symbol index.

46. The readable storage medium of claim 38, wherein the first slot interlace is for a first slot, and the second slot interlace is for a second slot, and wherein the instructions further comprise code for providing additional slot interlaces for all other slots based on the first slot interlace and the one or more distance vectors.

47. The readable storage medium of claim 38, wherein the instructions further comprise code for determining the length of a channel estimate of a transmit or receive channel.

48. The readable storage medium of claim 38, wherein the second slot interlace maps a slot into one or more interlaces or maps an interlace into one or more slots, and wherein a symbol corresponds to one or more MAC time units, or a MAC time unit corresponds to one or more symbols.

49. The readable storage medium of claim 38, wherein the instructions further comprise code for:

representing two times a symbol index as a $k_1$-bit long number, wherein $k_1$ is an integer;

determining $n_i$ number of $1^{st}$ groups for the $k_i$-bit long number, wherein each of the $1^{st}$ groups is m-bits long, m is greater than or equal to 2, m is less than $k_1$, m is an integer, $n_i$ is an integer, and the $1^{st}$ groups are represented as $1^{st}$ group 1 through $1^{st}$ group $n_1$;

grouping the $k_1$-bit long number into the $1^{st}$ group 1 through the $1^{st}$ group $n_1$; and adding the $1^{st}$ group 1 through the $1^{st}$ group $n_i$ to generate a $k_2$-bit long number, wherein $k_2$ is less than $k_1$, and $k_2$ is an integer.

50. The readable storage medium of claim 49, wherein the instructions further comprise code for:

determining $n_1$ number of $i^{th}$ groups for the $k_1$-bit long number, wherein each of the $i^{th}$ groups is m-bits long, i is an integer, i is greater than 1, and the $i^{th}$ groups are represented as $i^{th}$ group 1 through $i^{th}$ group $n_i$; W grouping the $k_i$-bit long number into the $i^{th}$ group 1 through the $i^{th}$ group $n_1$;

adding the $i^{th}$ group 1 through the $i^{th}$ group $n_1$ to generate a $k_{i+1}$-bit long number, wherein $k_{i+1}$ is less than $k_{i+1}$ and $k_{i+1}$ is an integer;

incrementing i; and repeating the steps of determining $n_i$ number of $i^{th}$ groups, grouping the $k_1$-bit long number, adding the $i^{th}$ group 1 through the $i^{th}$ group $n_1$, and incrementing i, until $k_{i+1}$ is equal to or less than m.

51. A transmitter or receiver device, comprising:
a pilot interlace vector unit configured to include one or more pilot interlace vectors determined by at least one staggering pattern;
a distance vector unit configured to include one or more distance vectors for a slot-to-interlace map, wherein the one or more distance vectors are used to determine an interlace index for each data slot of the slot-to-interlace map, and wherein a length of the one or more distance vectors is a number of interlaces in the slot-to-interlace map minus a number of the one or more pilot interlace vectors; and
a slot interlace computation unit configured to provide a first slot interlace based on the one or more pilot interlace vectors and further configured to provide a second slot interlace based on the first slot interlace and the one or more distance vectors.

52. A transmitter or receiver device, comprising:
a processing system configured to include one or more pilot interlace vectors and one or more distance vectors, the processing system further configured to provide a first slot interlace based on the one or more pilot interlace vectors, the processing system further configured to provide a second slot interlace based on the first slot interlace and the one or more distance vectors.

53. The transmitter or receiver device of claim 52, wherein the processing system is further configured to provide the first slot interlace based on the one or more pilot interlace vectors and a symbol index.

54. The transmitter or receiver device of claim 52, wherein the one or more distance vectors include a plurality of distance vectors, and the processing system is further configured to select a distance vector from the plurality of distance vectors based on a symbol index.

55. The transmitter or receiver device of claim 54, wherein the processing system is further configured to provide the second slot interlace based on the first slot interlace and the selected distance vector.

56. The transmitter or receiver device of claim 54, wherein the one or more pilot interlace vectors include a plurality of pilot interlace vectors, the processing system is further configured to select a pilot interlace vector from the plurality of pilot interlace vectors based on a symbol index, and the processing system is further configured to select the distance vector from the plurality of distance vectors based on the symbol index and the selected pilot interlace.

57. The transmitter or receiver device of claim 52, wherein the first slot interlace includes one or more pilot interlaces, and the second slot interlace includes one or more slot interlaces for data.

58. The transmitter or receiver device of claim 52, wherein the processing system is further configured to rotate the one or more distance vectors to provide the second slot interlace.

59. The transmitter or receiver device of claim 52, wherein the processing system is further configured to provide the one or more pilot interlace vectors based on one or more staggering patterns.

60. The transmitter or receiver device of claim 52, wherein the processing system is further configured to select a pilot interlace vector from the one or more pilot interlace vectors based on a symbol index.

61. The transmitter or receiver device of claim 52, wherein the first slot interlace is for a first slot, the second slot interlace is for a second slot, and the processing system is further configured to provide additional slot interlaces for all other slots based on the first slot interlace and the one or more distance vectors.

62. The transmitter or receiver device of claim 52, wherein the processing system is further configured to determine the length of a channel estimate of a transmit or receive channel.

63. The transmitter or receiver device of claim 52, wherein the second slot interlace is configured to map a slot into one or more interlaces or map an interlace into one or more slots, and wherein a symbol corresponds to one or more MAC time units, or a MAC time unit corresponds to one or more symbols.

64. A transmitter or receiver device, comprising:
means for including one or more pilot interlace vectors;
means for including one or more distance vectors;
means for providing a first slot interlace based on the one or more pilot interlace vectors; and
means for providing a second slot interlace based on the first slot interlace and the one or more distance vectors.

65. The transmitter or receiver device of claim 64, wherein the means for providing the first slot interlace is configured to provide the first slot interlace based on the one or more pilot interlace vectors and a symbol index.

66. The transmitter or receiver device of claim 64, wherein the one or more distance vectors include a plurality of distance vectors, and the transmitter or receiver device further comprises means for selecting a distance vector from the plurality of distance vectors based on a symbol index.

67. The transmitter or receiver device of claim 66, wherein the means for providing the second slot interlace is configured to provide the second slot interlace based on the first slot interlace and the selected distance vector.

68. The transmitter or receiver device of claim 66, wherein the one or more pilot interlace vectors include a plurality of pilot interlace vectors, and wherein the transmitter or receiver device further comprises:
means for selecting a pilot interlace vector from the plurality of pilot interlace vectors based on a symbol index; and
means for selecting the distance vector from the plurality of distance vectors based on the symbol index and the selected pilot interlace.

69. The transmitter or receiver device of claim 64, wherein the first slot interlace includes one or more pilot interlaces, and the second slot interlace includes one or more slot interlaces for data.

70. The transmitter or receiver device of claim 64, further comprising means for rotating the one or more distance vectors to provide the second slot interlace.

71. The transmitter or receiver device of claim 64, further comprising means for providing the one or more pilot interlace vectors based on one or more staggering patterns.

72. The transmitter or receiver device of claim 64, further comprising means for selecting a pilot interlace vector from the one or more pilot interlace vectors based on a symbol index.

73. The transmitter or receiver device of claim 64, wherein the first slot interlace is for a first slot, and the second slot interlace is for a second slot, and wherein the transmitter or receiver device further comprises means for providing additional slot interlaces for all other slots based on the first slot interlace and the one or more distance vectors.

74. The transmitter or receiver device of claim 64, further comprising means for determining the length of a channel estimate of a transmit or receive channel.

75. The transmitter or receiver device of claim 64, wherein the second slot interlace is configured to map a slot into one or more interlaces or map an interlace into one or more slots, and wherein a symbol corresponds to one or more MAC time units, or a MAC time unit corresponds to one or more symbols.

76. A method of providing slot interlaces or providing communication at a transmitter or receiver device, comprising:
- receiving one or more pilot interlace vectors;
- receiving one or more distance vectors;
- providing a first slot interlace based on the one or more pilot interlace vectors; and
- providing a second slot interlace based on the first slot interlace and the one or more distance vectors.

77. The method of claim 76, wherein the step of providing the first slot interlace comprises providing the first slot interlace based on the one or more pilot interlace vectors and a symbol index.

78. The method of claim 76, wherein the one or more distance vectors include a plurality of distance vectors, and the method further comprises selecting a distance vector from the plurality of distance vectors based on a symbol index.

79. The method of claim 78, wherein the step of providing the second slot interlace comprises providing the second slot interlace based on the first slot interlace and the selected distance vector.

80. The method of claim 78, wherein the one or more pilot interlace vectors include a plurality of pilot interlace vectors, wherein the method further comprises:
- selecting a pilot interlace vector from the plurality of pilot interlace vectors based on a symbol index; and
- selecting the distance vector from the plurality of distance vectors based on the symbol index and the selected pilot interlace.

81. The method of claim 76, wherein the first slot interlace includes one or more pilot interlaces, and the second slot interlace includes one or more slot interlaces for data.

82. The method of claim 76, further comprising rotating the one or more distance vectors to provide the second slot interlace.

83. The method of claim 76, further comprising providing the one or more pilot interlace vectors based on one or more staggering patterns.

84. The method of claim 76, further comprising selecting a pilot interlace vector from the one or more pilot interlace vectors based on a symbol index.

85. The method of claim 76, wherein the first slot interlace is for a first slot, and the second slot interlace is for a second slot, and wherein the method further comprises providing additional slot interlaces for all other slots based on the first slot interlace and the one or more distance vectors.

86. The method of claim 76, further comprising determining the length of a channel estimate of a transmit or receive channel.

87. The method of claim 76, wherein the second slot interlace maps a slot into one or more interlaces or maps an interlace into one or more slots, and wherein a symbol corresponds to one or more MAC time units, or a MAC time unit corresponds to one or more symbols.

88. The method of claim 76, wherein the step of providing the second slot interlace comprises:
- representing two times a symbol index as a $k_1$-bit long number, wherein $k_1$ is an integer;
- determining $n_1$ number of $1^{st}$ groups for the $k_1$-bit long number, wherein each of the $1^{st}$ groups is m-bits long, m is greater than or equal to 2, m is less than $k_1$, m is an integer, $n_1$ is an integer, and the $1^{st}$ groups are represented as $1^{st}$ group 1 through $1^{st}$ group $n_1$;
- grouping the $k_1$-bit long number into the $1^{st}$ group 1 through the $1^{st}$ group $n_1$; and
- adding the $1^{st}$ group 1 through the $1^{st}$ group $n_1$ to generate $k_2$-bit long number, wherein $k_2$ is less than $k_1$, and $k_2$ is an integer.

89. The method of claim 88, wherein the step of providing the second slot interlace further comprises:
- determining $n_i$ number of $i^{th}$ groups for the $k_i$-bit long number, wherein each of the $i^{th}$ groups is m-bits long, i is an integer, i is greater than 1, and the $i^{th}$ groups are represented as $i^{th}$ group 1 through $i^{th}$ group $n_i$;
- grouping the $k_i$-bit long number into the $i^{th}$ group 1 through the $i^{th}$ group $n_i$;
- adding the $i^{th}$ group 1 through the $i^{th}$ group $n_i$ to generate a $k_{i+1}$-bit long number, wherein $k_{i+1}$ is less than $k_i$, and $k_{i+1}$ is an integer;
- incrementing i; and
- repeating the steps of determining $n_i$ number of $i^{th}$ groups, grouping the $k_i$-bit long number, adding the $i^{th}$ group 1 through the $i^{th}$ group $n_i$, and incrementing i, until $k_{i+1}$ is equal to or less than m.

90. The method of claim 76, further comprising:
- converting data streams to symbols;
- assigning the symbols into slots;
- mapping the slots into interlaces using the first slot interlace and the second slot interlace, wherein the first slot interlace includes one or more pilot interlaces, and the second slot interlace includes one or more slot interlaces for data;
- performing modulation;
- generating a modulated signal; and
- transmitting the modulated signal.

91. The method of claim 76, further comprising:
- obtaining symbols;
- separating the symbols into interlaces;
- mapping the interlaces into slots using the first slot interlace and the second slot interlace, wherein the first slot interlace includes one or more pilot interlaces, and the second slot interlace includes one or more slot interlaces for data;
- generating modulation symbols from the slots; and
- converting the modulation symbols to data streams.

92. A readable medium comprising instructions executable by a transmitter or receiver device, the instructions comprising code for:
- receiving one or more pilot interlace vectors;
- receiving one or more distance vectors;
- providing a first slot interlace based on the one or more pilot interlace vectors; and
- providing a second slot interlace based on the first slot interlace and the one or more distance vectors.

93. The readable medium of claim 92, wherein the code for providing the first slot interlace comprises code for providing the first slot interlace based on the one or more pilot interlace vectors and a symbol index.

94. The readable medium of claim 92, wherein the one or more distance vectors include a plurality of distance vectors, and the instructions further comprise code for selecting a distance vector from the plurality of distance vectors based on a symbol index.

95. The readable medium of claim 94, wherein the code for providing the second slot interlace comprises code for providing the second slot interlace based on the first slot interlace and the selected distance vector.

96. The readable medium of claim 94, wherein the one or more pilot interlace vectors include a plurality of pilot interlace vectors, wherein the instructions further comprise code for:
- selecting a pilot interlace vector from the plurality of pilot interlace vectors based on a symbol index; and
- selecting the distance vector from the plurality of distance vectors based on the symbol index and the selected pilot interlace.

97. The readable medium of claim 92, wherein the first slot interlace includes one or more pilot interlaces, and the second slot interlace includes one or more slot interlaces for data.

98. The readable medium of claim 92, wherein the instructions further comprise code for rotating the one or more distance vectors to provide the second slot interlace.

99. The readable medium of claim 92, wherein the instructions further comprise code for providing the one or more pilot interlace vectors based on one or more staggering patterns.

100. The readable medium of claim 92, wherein the instructions further comprise code for selecting a pilot interlace vector from the one or more pilot interlace vectors based on a symbol index.

101. The readable medium of claim 92, wherein the first slot interlace is for a first slot, and the second slot interlace is for a second slot, and wherein the instructions further comprise code for providing additional slot interlaces for all other slots based on the first slot interlace and the one or more distance vectors.

102. The readable medium of claim 92, wherein the instructions further comprise code for determining the length of a channel estimate of a transmit or receive channel.

103. The readable medium of claim 92, wherein the second slot interlace maps a slot into one or more interlaces or maps an interlace into one or more slots, and wherein a symbol corresponds to one or more MAC time units, or a MAC time unit corresponds to one or more symbols.

104. The readable medium of claim 92, wherein the instructions further comprise code for:
- representing two times a symbol index as a $k_1$-bit long number, wherein $k_1$ is an integer;
- determining $n_1$ number of $1^{st}$ groups for the $k_1$-bit long number, wherein each of the $1^{st}$ groups is m-bits long, m is greater than or equal to 2, m is less than $k_1$, m is an integer, $n_1$ is an integer, and the $1^{st}$ groups are represented as $1^{st}$ group 1 through $1^{st}$ group $n_i$;
- grouping the $k_1$-bit long number into the $1^{st}$ group 1 through the $1^{st}$ group $n_i$; and
- adding the $1^{st}$ group 1 through the $1^{st}$ group $n_1$ to generate a $k_2$-bit long number, wherein $k_2$ is less than $k_1$ and $k_2$ is an integer.

105. The readable medium of claim 104, wherein the instructions further comprise code for:
- determining $n_i$ number of $i^{th}$ groups for the $k_i$-bit long number, wherein each of the $i^{th}$ groups is m-bits long, i is an integer, i is greater than 1, and the $i^{th}$ groups are represented as $i^{th}$ group 1 through $i^{th}$ group $n_i$;
- grouping the $k_i$-bit long number into the $i^{th}$ group 1 through the $i^{th}$ group $n_i$;
- adding the $i^{th}$ group 1 through the $i^{th}$ group $n_i$ to generate a $k_{i+1}$-bit long number, wherein $k_{i+1}$ is less than $k_i$, and $k_{i+1}$ is an integer;
- incrementing i; and
- repeating the steps of determining $n_i$ number of $i^{th}$ groups, grouping the $k_i$-bit long number, adding the $i^{th}$ group 1 through the $i^{th}$ group $n_i$, and incrementing i, until $k_{i+1}$ is equal to or less than m.

106. A transmitter or receiver device, comprising:
- a pilot interlace vector unit configured to include one or more pilot interlace vectors;
- a distance vector unit configured to include one or more distance vectors; and
- a slot interlace computation unit configured to provide a first slot interlace based on the one or more pilot interlace vectors and further configured to provide a second slot interlace based on the first slot interlace and the one or more distance vectors.

* * * * *